(12) United States Patent
Hirai

(10) Patent No.: US 7,265,914 B2
(45) Date of Patent: Sep. 4, 2007

(54) LENS DEVICE AND PHOTOGRAPHING APPARATUS INCLUDING THE SAME

(75) Inventor: Keisuke Hirai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 11/092,306

(22) Filed: Mar. 29, 2005

(65) Prior Publication Data

US 2005/0219710 A1 Oct. 6, 2005

(30) Foreign Application Priority Data

Mar. 30, 2004 (JP) .............................. 2004-099141
Apr. 2, 2004 (JP) .............................. 2004-110180

(51) Int. Cl.
*G02B 15/14* (2006.01)
(52) U.S. Cl. ...................... 359/698; 359/694
(58) Field of Classification Search ................ 359/694, 359/698
See application file for complete search history.

(56) References Cited

U.S. PATENT DOCUMENTS

| 5,134,525 | A | * | 7/1992 | Kaneda | ...................... | 359/697 |
| 5,930,054 | A | | 7/1999 | Kasuya | | |
| 6,178,051 | B1 | * | 1/2001 | Tanaka | ...................... | 359/698 |
| 6,337,952 | B1 | * | 1/2002 | Kubo | ......................... | 396/76 |
| 7,053,936 | B2 | * | 5/2006 | Imura et al. | ............ | 348/231.2 |
| 2001/0055481 | A1 | | 12/2001 | Yoshikawa | | |

FOREIGN PATENT DOCUMENTS

EP 0394901 4/1990
EP 0685751 5/1995

* cited by examiner

*Primary Examiner*—Jordan Schwartz
*Assistant Examiner*—James C Jones
(74) *Attorney, Agent, or Firm*—Canon U.S.A. Inc I.P. Div

(57) ABSTRACT

In a lens device, when a lens is subjected to speed control and when initialization in which an absolute position of the lens is initialized after a power supply is turned on is completed, the lens is returned to a position before the lens is initialized.

10 Claims, 19 Drawing Sheets

LENS DEVICE AND PHOTOGRAPHING APPARATUS INCLUDING THE SAME

CROSS REFERENCE TO RELATED APPLICATION

This application is related to co-pending application 11/092,508 filed on Mar. 29, 2005.

BACKGROUND OF THE INVENTION

1. Field of the Invention

The present invention relates to lens devices and to photographing apparatuses including television cameras, video cameras, television lenses, video lenses, or the like on which lens devices are installed.

2. Description of the Related Art

The structure of television lenses for broadcasting television cameras, such as electronic news gathering (ENG) cameras, that have recently been used for news reports, relays, dramas, variety shows, and documentaries, will be described with reference to FIGS. 17 to 19.

FIG. 17 is an external view of an ENG camera zoom lens viewed from above. FIG. 18 is an external view of the ENG camera zoom lens viewed from the side.

Referring to FIGS. 17 and 18, a lens-barrel 100 contains a fixed focus lens, a movable focus lens, a zoom lens, an iris mechanism, a relay lens, and an extender. A focus ring 101 adjusts the focus by rotating to move the movable focus lens back and forth along an optical axis. A zoom ring 102 adjusts the zoom by rotating to move the zoom lens back and forth along the optical axis. An iris ring 103 adjusts the diameter of an iris diaphragm by rotating. A drive unit 104 is installed on the lens-barrel 100 of the ENG zoom lens and includes a motor for motor-driving the zoom, focus, and iris, a position detector, a control circuit, and a clutch and a switch for selecting between motor-driving the zoom, focus, and iris and manually driving the zoom, focus, and iris. A zoom switch 105 controls motor-driving of the zoom. An iris motor/manual switch 106 is used for selecting between motor-driving the iris and manually driving the iris. A lens cable 107 is an electrical interface between the ENG lens and the ENG camera. The lens cable 107 is used for supplying a command signal to motor-drive the iris from the ENG camera and for supplying position signals of the zoom lens, the focus lens, and the iris mechanism to the ENG camera. A zoom switch speed control knob 108 is used for changing the driving speed of the zoom lens with respect to the control input to the zoom switch 105 when the zoom is motor-driven. A zoom clutch 109 is used for selecting between motor-driving the zoom and manually driving the zoom. A focus clutch 110 is used for selecting between driving the focus based on demand and manually driving the focus.

FIG. 19 shows the structure of the ENG camera and the ENG camera zoom lens.

Referring to FIG. 19, a television lens 200 includes the lens-barrel 100, the lens cable 107, and the like. A television camera 201 is connected to the lens cable 107 and includes a charge-coupled device (CCD) 40, a video signal processing unit 41, a video signal recording and playback unit 42, a video signal display unit 43, and the like.

A zoom speed command signal generation unit 1 detects a zoom speed command signal for instructing the zoom driving direction and the zoom driving speed, which are proportional to the control input to the zoom switch 105, in order to motor-drive a zoom optical system 9. The zoom speed command signal generation unit 1 includes an analog detector, such as a potentiometer or a control knob, and a digital detector, such as a rotary encoder. A zoom speed command signal operation unit 2 performs signal level conversion/signal shift conversion for taking the zoom speed command signal into an analog-to-digital (A/D) conversion unit 3. The A/D conversion unit 3 converts an analog signal output from the zoom speed command signal operation unit 2 into a digital signal. A central processing unit (CPU) 4 controls the operation of each unit of the television lens 200. A digital-to-analog (D/A) conversion unit 5 converts a zoom control signal, which is a digital signal, output from the CPU 4 to motor-drive the zoom optical system 9 into an analog signal. A zoom control signal operation unit 6 performs signal level conversion/signal shift conversion on the zoom control signal output from the D/A conversion unit 5. A zoom power amplifying unit 7 drives a zoom motor 8. The zoom motor 8 drives the zoom optical system 9. The zoom optical system 9 adjusts the power of an optical device.

A zoom absolute position signal detection unit 10 outputs a zoom absolute position signal corresponding to the absolute position of the zoom optical system 9. A zoom absolute position signal operation unit 11 performs signal level conversion/signal shift conversion for taking the zoom absolute position signal into an A/D conversion unit 12. The A/D conversion unit 12 converts an analog signal output from the zoom absolute position signal operation unit 11 into a digital signal.

A zoom switch speed control position signal operation unit 13 performs signal level conversion/signal shift conversion for taking a zoom switch speed control position signal into an A/D conversion unit 14. The A/D conversion unit 14 converts an analog signal output from the zoom switch speed control position signal operation unit 13 into a digital signal.

A zoom demand unit 15 is connected to the television lens 200. The zoom demand unit 15 controls the zoom optical system 9 using a zoom demand operation unit 16. The zoom demand operation unit 16 controls the zoom optical system 9 by adjusting the rotation angle. A zoom demand counter 17 detects a zoom driving position signal that is proportional to the angle of rotation given by the zoom demand operation unit 16. The zoom demand counter 17 includes an analog detector, such as a potentiometer or a control knob.

A D/A conversion unit 18 converts a focus control signal, which is a digital signal, output from the CPU 4 to motor-drive a focus optical system 22 into an analog signal. A focus control signal operation unit 19 performs signal level conversion/signal shift conversion on the focus control signal output from the D/A conversion unit 18. A focus power amplifying unit 20 drives a focus motor 21. The focus motor 21 drives the focus optical system 22. The focus optical system 22 adjusts the focus of the optical device.

A focus absolute position signal detection unit 23 outputs a focus absolute position signal corresponding to the absolute position of the focus optical system 22. A focus absolute position signal operation unit 24 performs signal level conversion/signal shift conversion for taking the focus absolute position signal into an A/D conversion unit 25. The A/D conversion unit 25 converts an analog signal output from the focus absolute position signal operation unit 24 into a digital signal.

A focus demand unit 26 is connected to the television lens 200. The focus demand unit 26 controls the focus optical system 22 using a focus demand operation unit 27. The focus demand operation unit 27 controls the focus optical system 22 by adjusting the rotation angle. A focus demand counter 28 detects a focus driving position signal that is proportional to the angle of rotation given by the focus demand operation unit 27. The focus demand counter 28 includes an analog detector, such as a potentiometer or a control knob.

A D/A conversion unit 29 converts an iris control signal, which is a digital signal, output from the CPU 4 to motor-drive an iris mechanism 33 into an analog signal. An iris control signal operation unit 30 performs signal level conversion/signal shift conversion on the iris control signal output from the D/A conversion unit 29. An iris power amplifying unit 31 drives an iris motor 32. The iris motor 32 drives the iris mechanism 33. The iris mechanism 33 adjusts the amount of light of the optical device.

An iris absolute position signal detection unit 34 outputs an iris absolute position signal corresponding to the absolute position of the iris mechanism 33. An iris absolute position signal operation unit 35 performs signal level conversion/ signal shift conversion for taking the iris absolute position signal into an A/D conversion unit 36. The A/D conversion unit 36 converts an analog signal output from the iris absolute position signal operation unit 35 into a digital signal.

A lens information display unit 37 displays an operation state of the television lens 200. A volatile storage unit 38 stores various types of information of the television lens 200.

A CPU 39 controls the operation of each function of the television camera 201. The CCD (image pickup element) 40 converts an optical signal received via the television lens 200 into an electric signal and outputs the electric signal as a video signal. The video signal processing unit 41 processes the video signal output from the CCD 40. The video signal recording and playback unit 42 records and plays back the video signal processed by the video signal processing unit 41. The video signal display unit 43 displays an operation state of the television camera 201 and photographed pictures. A reference voltage generation unit 44 generates a reference voltage based on a power supplied from a power supply unit 46. A power switching unit 45 turns on or turns off the power of the television camera 201. The power supply unit 46 supplies the power to the television lens 200 and the television camera 201.

Operation of the zoom switch 105, the zoom clutch 109, and the zoom demand operation unit 16 when the zoom optical system 9 is operated using the ENG zoom lens and the ENG camera with the foregoing structure is described next. When the zoom clutch 109 is turned off and when the zoom switch 105 is operated, the control input to the zoom switch 105 is calculated using the zoom speed command signal generation unit 1, the zoom speed command signal operation unit 2, the A/D conversion unit 3, and the CPU 4. When the zoom demand unit 15 is operated, the control input to the zoom demand unit 15 is calculated using the zoom demand counter 17 and the CPU 4. At the same time, the absolute position of the zoom optical system 9 is calculated using the zoom absolute position signal detection unit 10, the zoom absolute position signal operation unit 11, and the A/D conversion unit 12. Based on these control inputs and the absolute position, the CPU 4 calculates a target position of the zoom optical system 9. Then, based on the target position, the D/A conversion unit 5, the zoom control signal operation unit 6, the zoom power amplifying unit 7, and the zoom motor 8 drive the zoom optical system 9.

Operation of the focus clutch 110 and the focus demand operation unit 27 when the focus optical system 22 is operated using the ENG zoom lens and the ENG camera with the foregoing structure is described next. When the focus clutch 110 is turned off and when the focus demand unit 26 is operated, the control input to the focus demand unit 26 is calculated using the focus demand counter 28 and the CPU 4. At the same time, the absolute position of the focus optical system 22 is calculated using the focus absolute position signal detection unit 23, the focus absolute position signal operation unit 24, and the A/D conversion unit 25. Based on the control input and the absolute position, the CPU 4 calculates a target position of the focus optical system 22. Then, based on the target position, the D/A conversion unit 18, the focus control signal operation unit 19, the focus power amplifying unit 20, and the focus motor 21 drive the focus optical system 22.

Operation of the iris motor/manual switch 106 when the iris mechanism 33 is operated using the ENG zoom lens and the ENG camera with the foregoing structure is described next. When the iris motor/manual switch 106 selects motor driving, the absolute position of the iris mechanism 33 is calculated using the iris absolute position signal detection unit 34, the iris absolute position signal operation unit 35, and the A/D conversion unit 36. At the same time, in accordance with a result of processing of the video signal processing unit 41, the CPU 39 calculates a target position of the iris mechanism 33. Then, based on the target position, the D/A conversion unit 29, the iris control signal operation unit 30, the iris power amplifying unit 31, and the iris motor 32 drive the iris mechanism 33.

Structures of an ENG camera zoom lens including an absolute position signal detection unit and a relative position signal detection unit are suggested in U.S. patent application No. 2001-055481 and U.S. Pat. No. 5,930,054.

In the known examples, however, since the position of a lens is detected using an absolute position detection unit, typified by a potentiometer, and an A/D conversion unit, the accuracy in detecting the position of the lens cannot be increased due to noise caused by friction of the potentiometer and the limited resolution of the A/D conversion unit. Also, since an A/D conversion unit is necessary, the size of the circuit may increase, and the cost may thus increase.

In contrast, a relative position detection unit, such as an optical incremental sensor or a magnetic incremental sensor, exhibits less noise and a higher resolution compared with an absolute position detection unit and does not require an A/D conversion unit. Thus, if a relative position detection unit is used, the foregoing problems can be solved.

However, if a relative position detection unit is used, an operation of setting the absolute position of a lens is required. As a result, a photographer cannot start photographing immediately after a power supply is turned on, and the number of operations required for the photographer is increased.

Since a relative position detection unit, such as an optical incremental sensor or a magnetic incremental sensor, exhibits less noise and a higher resolution compared with an absolute position detection unit and does not require an A/D conversion unit, if a relative position detection unit is used and motor driving is selected, the forgoing problems can be solved by automatically performing initialization after power supply is turned on. However, if manual driving is selected, initialization cannot be automatically performed after the power supply is turned on. Thus, it is difficult to install a relative position detection unit in a television lens having a manual driving unit. In addition, the power is turned on and turned off a large number of times depending on the intended use, and initialization may be automatically performed many times a day. As a result, a photographer cannot start photographing quickly, and the photographer may thus feel uncomfortable. Furthermore, pictures may move during initialization, and unnecessary battery power may be consumed for battery-operated apparatuses.

SUMMARY OF THE INVENTION

The present invention is directed to a lens device including a manual driving unit and a relative position detection unit, in which the lens device semi-automatically initializes an absolute position of a lens after a power supply is turned on so that improved operability and higher accuracy are achieved without requiring a photographer to adjust the absolute position of the lens every time the power supply is turned on.

According to an aspect of the present invention, a lens device includes an optical element; a relative position control unit for controlling a relative position of the optical element; a relative position detection unit; and an initialization control unit for initializing an absolute position of the optical element after a power supply is turned on and for returning the optical element to a position before the initialization in a first mode in which a control procedure for moving the optical element is set to a speed control procedure. Thus, a photographer can start photographing immediately after the initialization is completed.

According to another aspect of the present invention, a lens device includes an optical element; a relative position control unit for controlling a relative position of the optical element; a relative position detection unit; and an initialization control unit for initializing an absolute position of the optical element after a power supply is turned on and for moving the optical element to a position designated in advance that is different from a position of the optical element before the initialization. Thus, a photographer can start photographing immediately after the initialization is completed.

According to another aspect of the present invention, a lens device includes an optical element; a relative position control unit for controlling a relative position of the optical element; a relative position detection unit; and an initialization control unit for initializing an absolute position of the optical element after a power supply is turned on and for moving the optical element to a position designated in advance that is different from a position of the optical element before the initialization. Thus, a photographer can start photographing immediately after the initialization is completed.

According to yet another aspect of the present invention, a lens device includes an optical element; a relative position detection unit; and an absolute position detection unit. An absolute position of the optical element is initialized using the relative position detection unit and the absolute position detection unit after a power supply is turned on.

According to another aspect of the present invention, a photographing apparatus includes the foregoing lens device and a camera device on which the lens device is installed.

Further features and advantages of the present invention will become apparent from the following description of exemplary embodiments with reference to the attached drawings.

DESCRIPTION OF THE EMBODIMENTS

First Embodiment

A first embodiment of the present invention will be described with reference to FIGS. 1 to 3.

Figure 1:
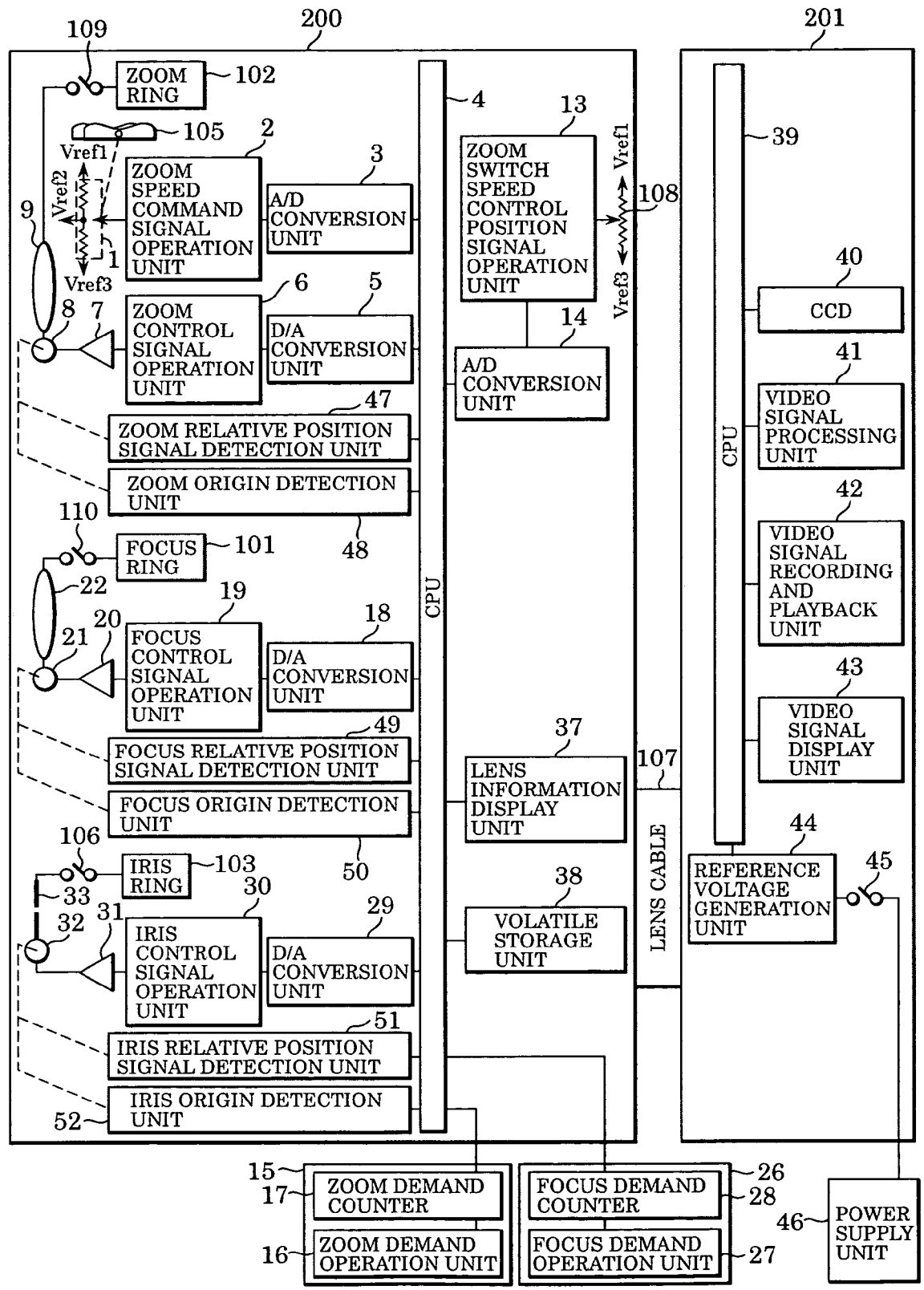
FIG. 1 is a block diagram of an optical device according to a first or second embodiment of the present invention.
Figure 19:
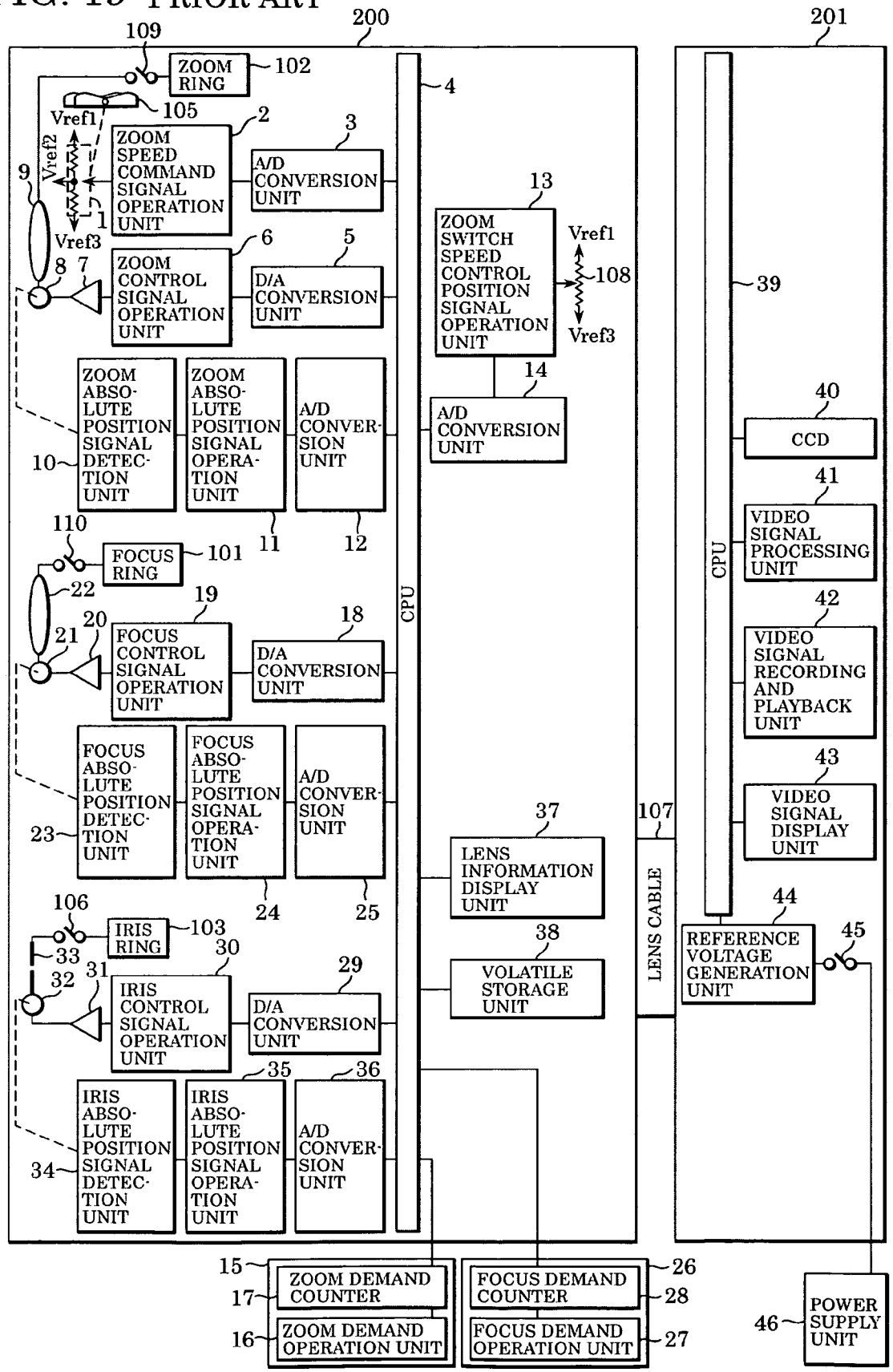
FIG. 19 is a block diagram of a known optical device.

Since parts represented using reference numerals 1 to 9, 13 to 22, 26 to 33, and 37 to 46 in FIG. 1 are the same as in FIG. 19, the descriptions of these same parts will not be repeated here. Referring to FIG. 1, a zoom relative position signal detection unit 47 outputs a zoom relative position signal corresponding to the relative position of the zoom optical system 9. The zoom relative position signal detection unit 47 includes an optical incremental sensor or a magnetic incremental sensor.

A zoom origin detection unit 48 detects an original position of the zoom lens as an absolute value. The zoom origin detection unit 48 defines the position of the boundary between reflection and non-reflection of a light-emitting diode (LED) as the original position. For example, the zoom origin detection unit 48 performs edge detection. By this edge detection, the zoom origin detection unit 48 determines that the position of the zoom lens is set to a TELE (telescopic) side when reflection of the LED is detected and that the position of the zoom lens is set to a WIDE side when reflection of the LED is not detected.

A focus relative position signal detection unit 49 outputs a focus relative position signal corresponding to the relative position of the focus optical system 22. The focus relative position signal detection unit 49 includes an optical incremental sensor or a magnetic incremental sensor.

A focus origin detection unit 50 detects an original position of the focus lens as an absolute value. The focus origin detection unit 50 performs edge detection based on reflection and non-reflection of an LED.

An iris relative position signal detection unit 51 outputs an iris relative position signal corresponding to the relative position of the iris mechanism 33. The iris relative position signal detection unit 51 includes an optical incremental sensor or a magnetic incremental sensor.

An iris origin detection unit 52 detects an original position of the iris mechanism 33 as an absolute value. The iris origin detection unit 52 performs edge detection based on reflection and non-reflection of an LED.

Figure 2:
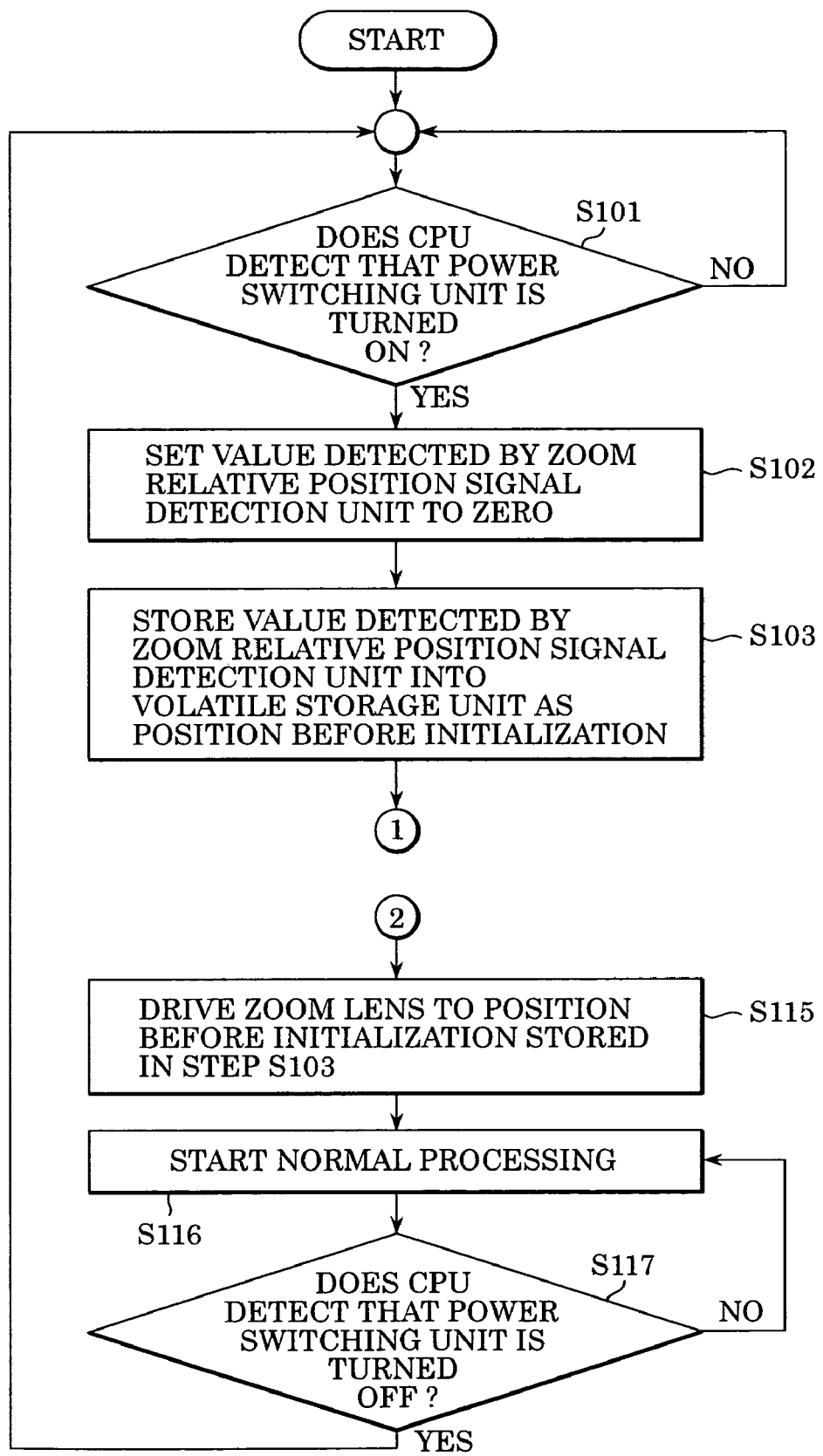
FIG. 2 is a flowchart showing a part of an initialization process according to the first embodiment.
Figure 3:
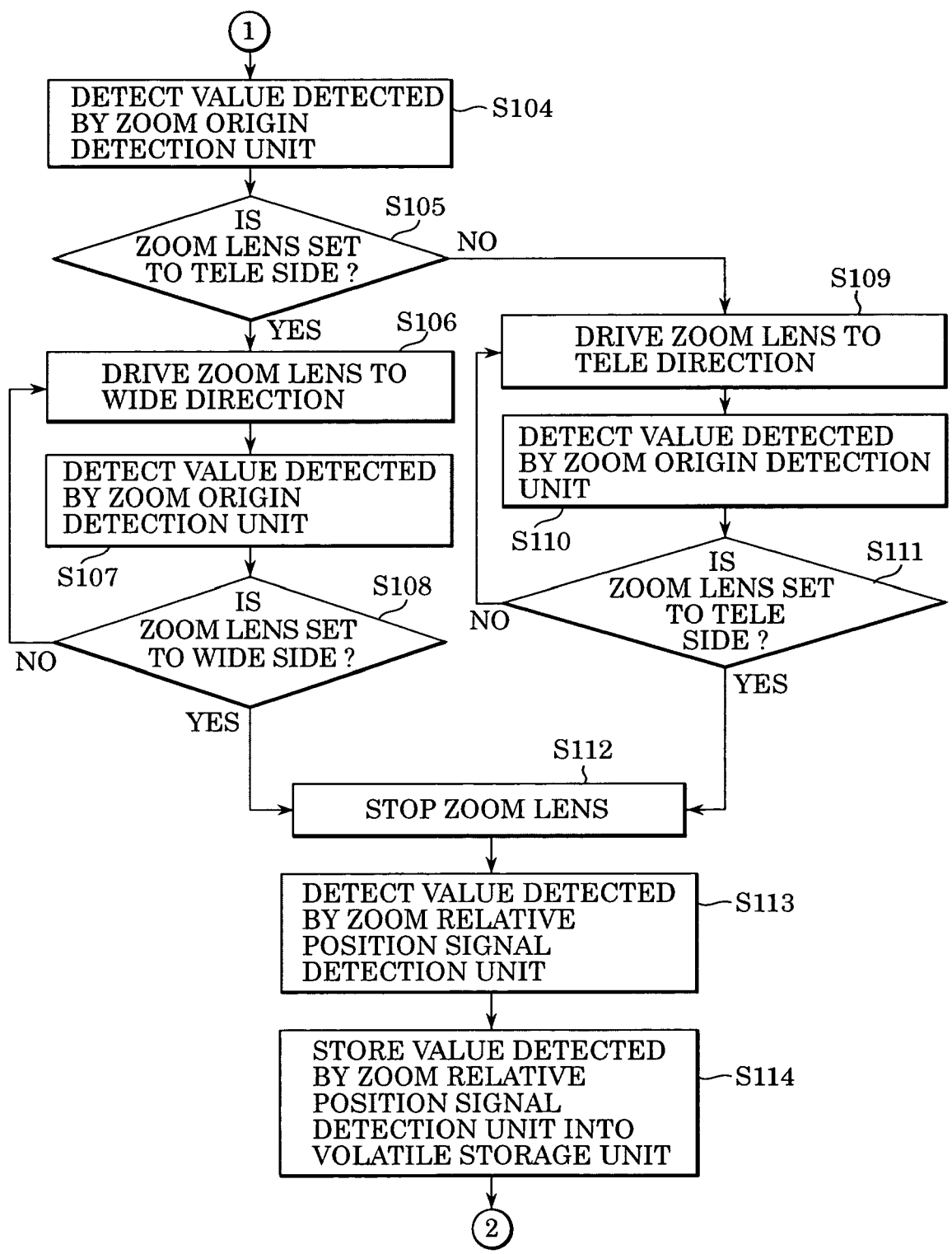
FIG. 3 is a flowchart showing another part of the initialization process according to the first embodiment.

FIGS. 2 and 3 are flowcharts showing an initialization process of the zoom relative position signal detection unit 47 according to the first embodiment performed by the CPU 4. Referring to FIG. 2, in step S101, it is determined whether or not the CPU 4 detects via the lens cable 107 that the power switching unit 45 is turned on. If the CPU 4 detects that the power switching unit 45 is turned on in step S101, the process proceeds to step S102 to initialize a value detected by the zoom relative position signal detection unit 47 to zero. Then, in step S103, the value detected by the zoom relative position signal detection unit 47 is stored into the volatile storage unit 38 as a position before initialization, and the process proceeds to step S104 shown in FIG. 3.

In step S104, the CPU 4 detects a value detected by the zoom origin detection unit 48. Then, in step S105, in accordance with the result detected by the zoom origin detection unit 48, it is determined whether or not the zoom lens is set to the TELE side. If the zoom lens is set to the TELE side in step S105, the process proceeds to step S106. If the zoom lens is not set to the TELE side in step S105, the process proceeds to step S109.

In step S106, the zoom lens is driven to the WIDE direction, and the process proceeds to step S107. In step S107, the CPU 4 detects a value detected by the zoom origin detection unit 48, and the process proceeds to step S108. In step S108, in accordance with the result detected by the zoom origin detection unit 48, it is determined whether or not the zoom lens is set to the WIDE side. If the zoom lens is set to the WIDE side in step S108, the process proceeds to step S112. If the zoom lens is not set to the WIDE side in step S108, the process returns to step S106.

In step S109, the zoom lens is driven to the TELE direction, and the process proceeds to step S110. In step S110, the CPU 4 detects a value detected by the zoom origin detection unit 48, and the process proceeds to step S111. In step S111, in accordance with the result detected by the zoom origin detection unit 48, it is determined whether or not the zoom lens is set to the TELE side. If the zoom lens is set to the TELE side in step S111, the process proceeds to step S112. If the zoom lens is not set to the TELE side in step S111, the process returns to step S109.

In step S112, the CPU 4 stops the zoom lens, and the process proceeds to step S113. In step S113, the CPU 4 detects a value detected by the zoom relative position signal detection unit 47, and the process proceeds to step S114. In step S114, the value detected by the zoom relative position signal detection unit 47 is stored into the volatile storage unit 38, and the process proceeds to step S115 shown in FIG. 2.

In step S115, the zoom lens is driven to the position before initialization, which is stored in step S103. Then, in step S116, the CPU 4 starts normal processing, such as driving the zoom lens in accordance with the control inputs to the zoom demand operation part 16 and the zoom ring 102, and the process proceeds to step S117. In step S117, it is determined whether or not the CPU 4 detects via the lens cable 107 that the power switching unit 45 is turned off. If the CPU 4 detects that the power switching unit 45 is turned off in step S117, the process returns to step S101. If the CPU 4 does not detect that the power switching unit 45 is turned off in step S117, the process returns to step S116.

During the period from turning on the power supply to start of the normal processing, a value detected by the zoom relative position signal detection unit 47 may be different from the absolute position. Thus, the lens information display unit 37 may display that initialization is being performed. If communication using the lens cable 107 is performed in the form of serial communication, transmission of a position signal of the zoom lens may be prohibited or a command (invalid signal) indicating a position signal of the zoom lens during initialization may be transmitted. If communication using the lens cable 107 is performed in the form of analog values, a line representing permission or prohibition of transmission of a position signal of the zoom lens may be provided to prohibit the transmission of the position signal of the zoom lens during initialization. An incorrect position of the lens may be sent back to the television camera in order to prevent malfunction and misunderstanding by a photographer.

One example of the invalid signal is a signal which continuously transmits a fixed amount of value or data even if the position signal of the lens has changed.

Another example of the invalid signal is a signal which continuously transmits a fixed amount of value or data corresponding to the change of the position signal of the lens.

Although a case for the zoom optical system 9 has been described in the first embodiment, initialization of a relative position signal detection unit for the focus optical system 22 and the iris mechanism 33 may be performed by similar processing.

As described above, in an optical device including a zoom lens, a focus lens, an iris mechanism, and a driving unit provided for each of the zoom lens, the focus lens, and the iris mechanism, a relative position detection unit can be automatically initialized by an absolute position detection unit immediately after a power supply is turned on. Thus, even if the relative position detection unit is used, an operation based on highly accurate absolute position can be performed. In addition, after initialization is completed, the lens automatically returns to a position before the power supply is turned on. Thus, a photographer does not need to adjust the position of the lens after initialization is performed, and highly accurate position detection and high operability can be realized. In addition, the size of the circuit is reduced, and the cost is thus reduced. Furthermore, the photographer can start photographing immediately after the power supply is turned on.

According to the first embodiment, every time power supply is turned on, the absolute position is automatically initialized using a relative position detection unit, such as an optical incremental sensor or a magnetic incremental sensor, and an origin detection unit. Thus, the position of a lens can be detected with high accuracy. In addition, initialization of the absolute position performed by a photographer every time the power supply is turned on can be eliminated. As a result, the lens can be operated with high accuracy. In addition, the photographer can start photographing immediately after the power supply is turned on.

Also, using the relative position detection unit, such as an optical incremental sensor or a magnetic incremental sensor, and the origin detection unit, every time the power supply is turned on, the position of the lens is detected and stored, the absolute position is automatically initialized, and the lens is returned to the stored position after initialization is completed. Thus, a picture photographed immediately after the power supply is turned on is prevented from being different from what is intended by the photographer even if initialization is automatically performed after the power supply is turned on. As a result, the lens can be operated with high accuracy. In addition, the photographer can start photographing immediately after the power supply is turned on.

Second Embodiment

A second embodiment of the present invention will be described with reference to FIGS. 1, 4, and 5.

The structure of an optical device according to the second embodiment is shown in FIG. 1. Since FIG. 1 has been described in the first embodiment, the descriptions will not be repeated here. FIGS. 4 and 5 are flowcharts showing an initialization process of the zoom relative position signal detection unit 47 according to the second embodiment performed by the CPU 4.

Figure 4:
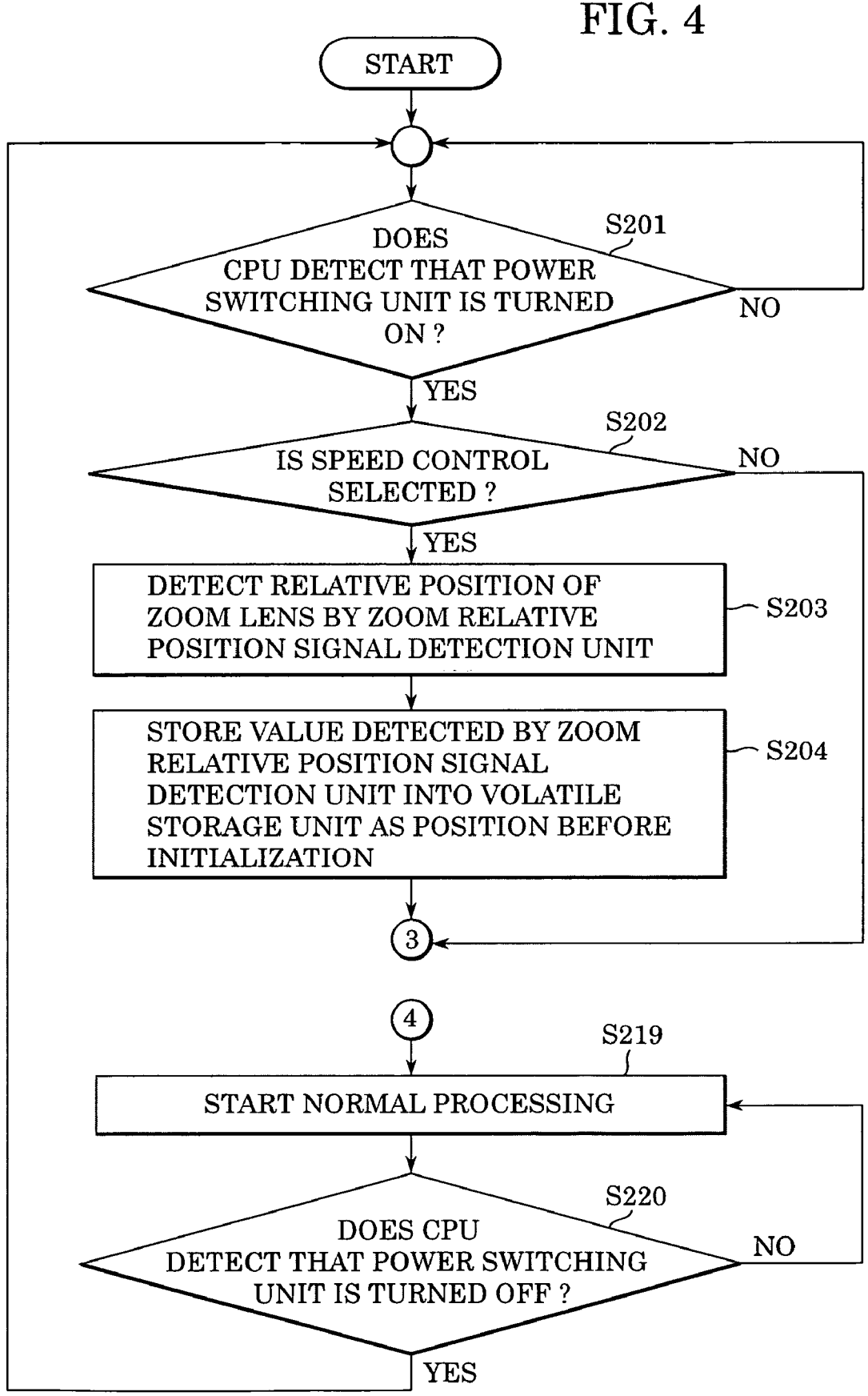
FIG. 4 is a flowchart showing a part of an initialization process according to the second embodiment.
Figure 5:
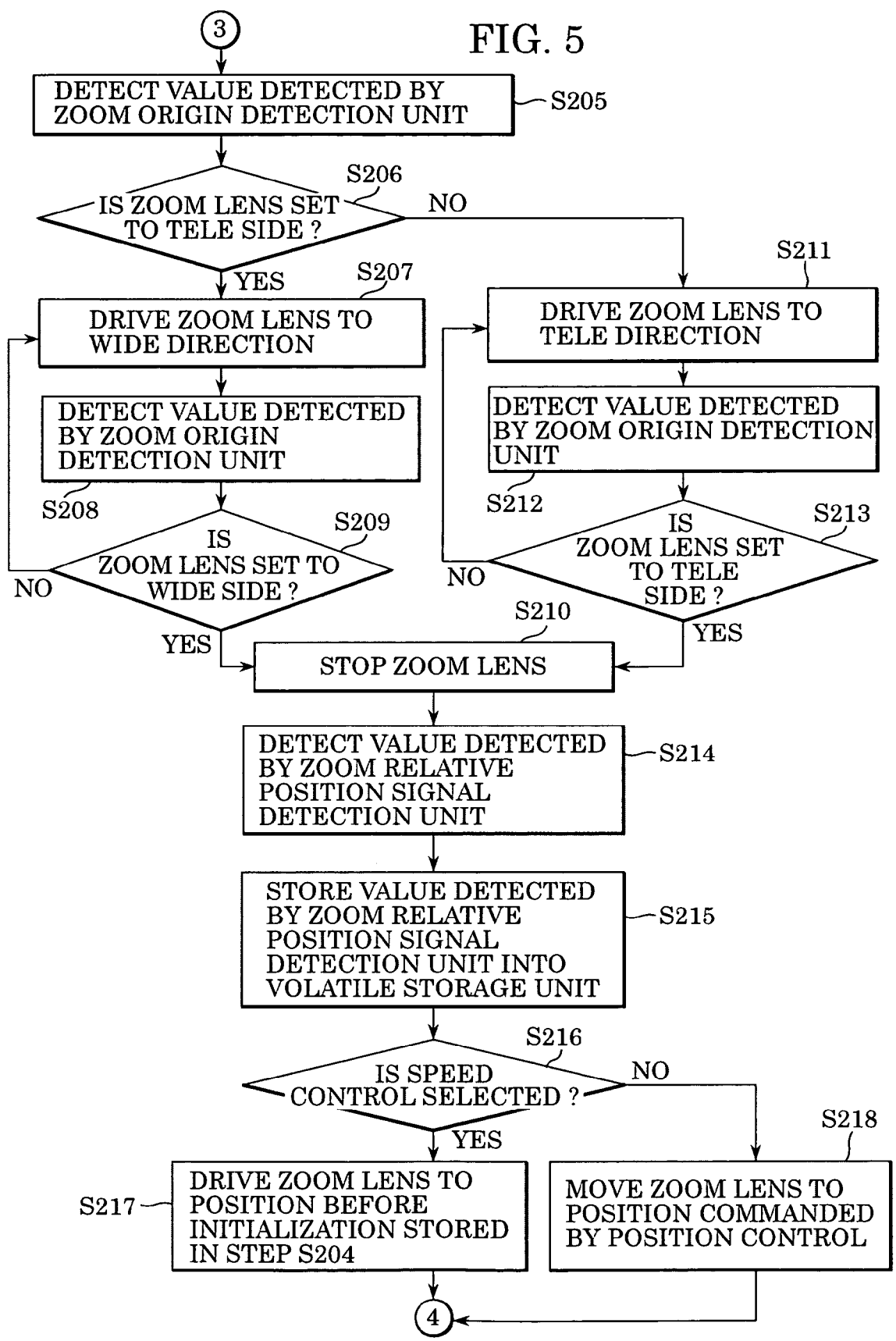
FIG. 5 is a flowchart showing another part of the initialization process according to the second embodiment.

Since processing in step S201, steps S203 to S215, step S217, step S219, and step S220 shown in FIGS. 4 and 5 are similar to the processing in steps S101 to S117 according to the first embodiment shown in FIGS. 2 and 3, descriptions of these steps will not be repeated here. Referring to FIG. 4, in step S202, it is determined whether the television lens 200 is set to a speed control procedure. For example, it is determined whether the zoom clutch 109 is turned off, the zoom demand unit 15 is connected to the television lens 200, and the control procedure is set to speed control. If the television lens 200 is set to the speed control procedure in step S202, the process proceeds to step S203. In contrast, if the television lens 200 is not set to the speed control procedure in step S202, the process proceeds to step S205 shown in FIG. 5.

In step S216, it is determined whether the television lens 200 is set to the speed control procedure. For example, it is determined whether the zoom clutch 109 is turned off, the zoom demand unit 15 is connected to the television lens 200, and the control procedure is set to speed control. If the television lens 200 is set to the speed control procedure in step S216, the process proceeds to step S217. In contrast, if the television lens 200 is not set to the speed control procedure in step S216, the process proceeds to step S218. In step S218, the zoom lens is moved to a position commanded by position control, and the process proceeds to step S219 shown in FIG. 4. Subsequently, similar processing is performed.

As described above, in an optical device including a zoom lens, a focus lens, an iris mechanism, and a driving unit provided for each of the zoom lens, the focus lens, and the iris mechanism, after initialization is automatically performed immediately after power supply is turned on, the position of the lens automatically returns to a position immediately before the power supply is turned on if speed control is selected, and the lens is driven to a position commanded by position control if speed control is not selected. Thus, a photographer does not need to adjust the position of the lens after initialization is performed. As a result, the photographer can start photographing immediately after the power supply is turned on. In addition, a picture photographed immediately after the power supply is turned on is prevented from being different from what is intended by the photographer.

According to the second embodiment, using a relative position detection unit, such as an optical incremental sensor or a magnetic incremental sensor, and an origin detection unit, every time power supply is turned on, the position of a lens is detected and stored, the absolute position is automatically initialized, it is determined whether or not the control procedure for the lens is set to speed control, the lens is returned to the stored position after the power supply is turned on if speed control is selected, and the lens is driven to a position commanded by position control if speed control is not selected (if position control is selected). Thus, a picture photographed immediately after the power supply is turned on is prevented from being different from what is intended by a photographer even if initialization is automatically performed after the power supply is turned on. As a result, the lens can be operated with high accuracy. In addition, the photographer can start photographing immediately after the power supply is turned on.

A speed control procedure is a procedure for controlling a speed of the lens by calculating a subsequent target speed from the speed difference between the target speed (command value) obtained by an operation of the photographer and the detected speed calculated from variation of time of detected values of the relative position signal detection unit and, repeating the same process continuously.

A position control procedure is a procedure for controlling a position of the lens by calculating a subsequent target position from the difference between the target position (command value) obtained by an operation of the photographer and the detected value of the relative position signal detection unit and, repeating the same process continuously.

A position command signal is a command signal obtained by converting the value of absolute position change of an operation unit where the photographer operates the operation unit.

After the power supply is turned on, an initialization of the absolute position of the lens is completed. After the completion of the initialization, a zoom lens is moved to a predetermined position that is different from the position of the zoom lens being placed before the initialization. The predetermined position that is different from the position of the zoom lens being placed before the initialization is, for example, in the view of the optical axis direction of the zoom optical system 9, at least one of the middle point of the stroke, the position of the optical side of the wide side, and the position of the optical side of the telephoto side.

Third Embodiment

A third embodiment of the present invention will be described with reference to FIGS. 6, 7, and 8.

Figure 6:
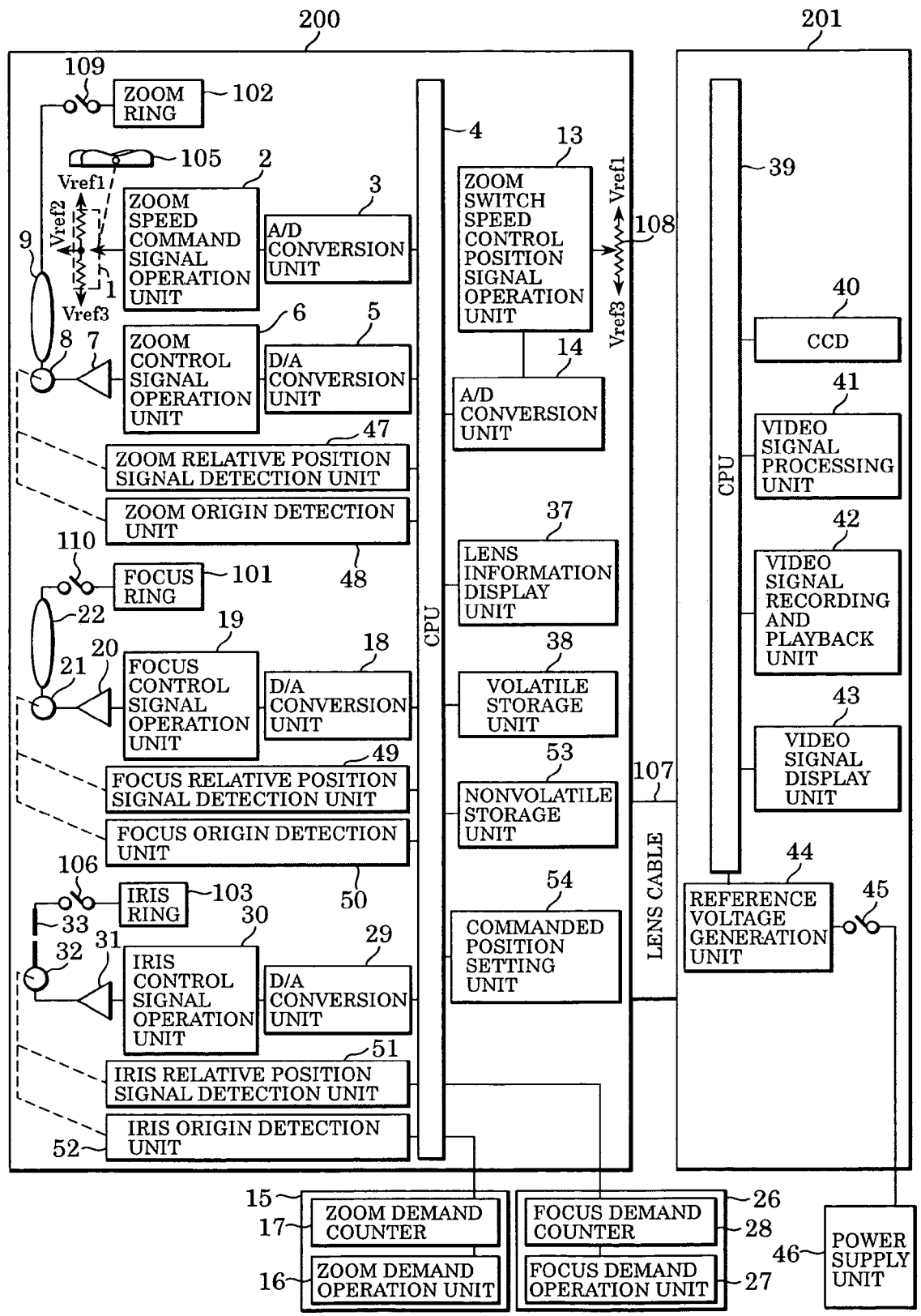
FIG. 6 is a block diagram of an optical device according to a third embodiment.

FIG. 6 shows the structure of an optical device according to the third embodiment of the present invention. In FIG. 6, since parts represented using reference numerals 1 to 52 are the same as in the first and second embodiments, the descriptions of these same parts will not be repeated here. Referring to FIG. 6, a nonvolatile storage unit 53 stores various types of lens information and is capable of holding the stored contents even after the power switching unit 45 is turned off. After initialization is completed, if the control procedure for the lens is set to speed control, a commanded position setting unit 54 gives an instruction to store the stopping position of the lens into the nonvolatile storage unit 53.

Figure 7:
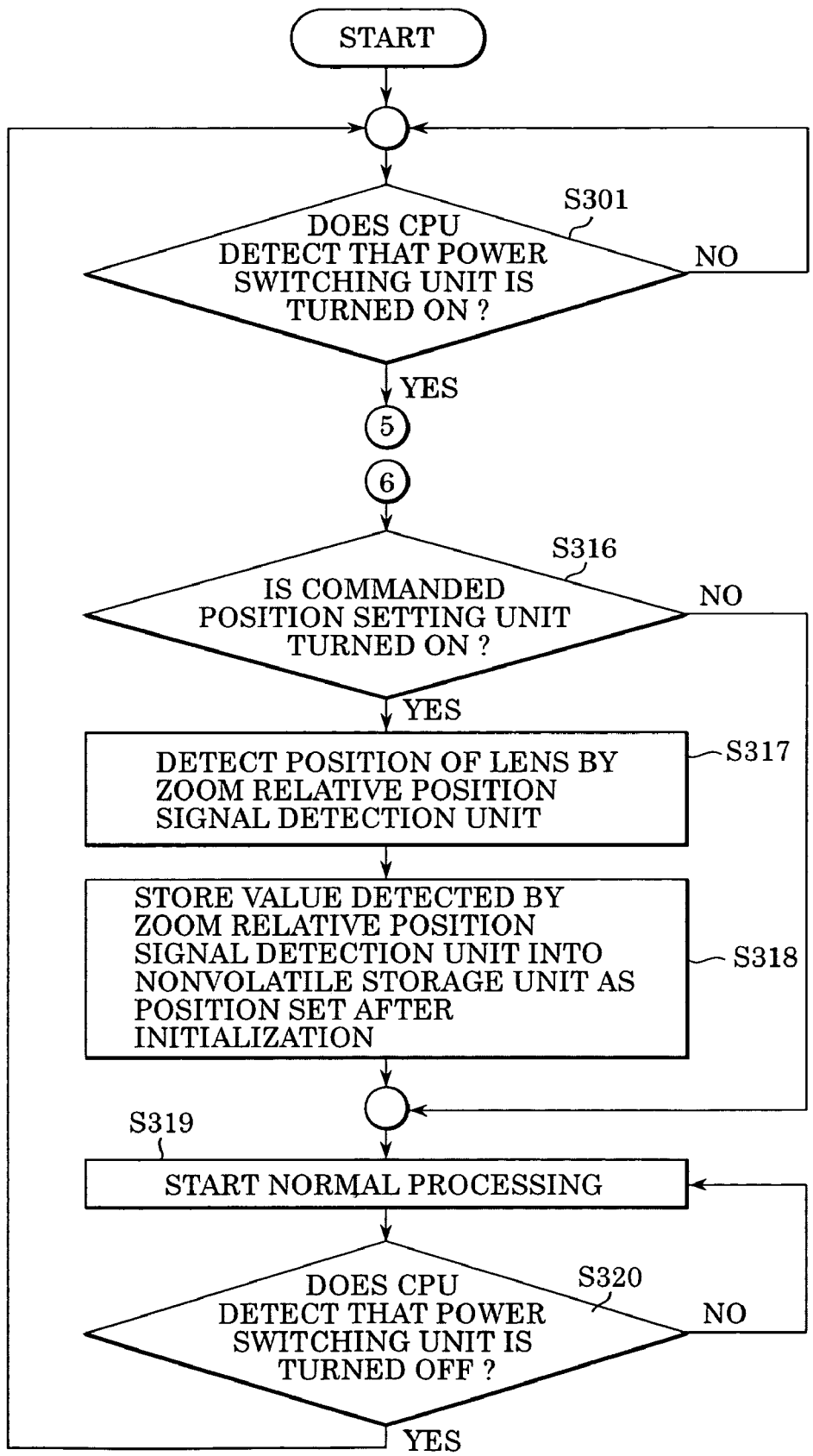
FIG. 7 is a flowchart showing a part of an initialization process according to the third embodiment.
Figure 8:
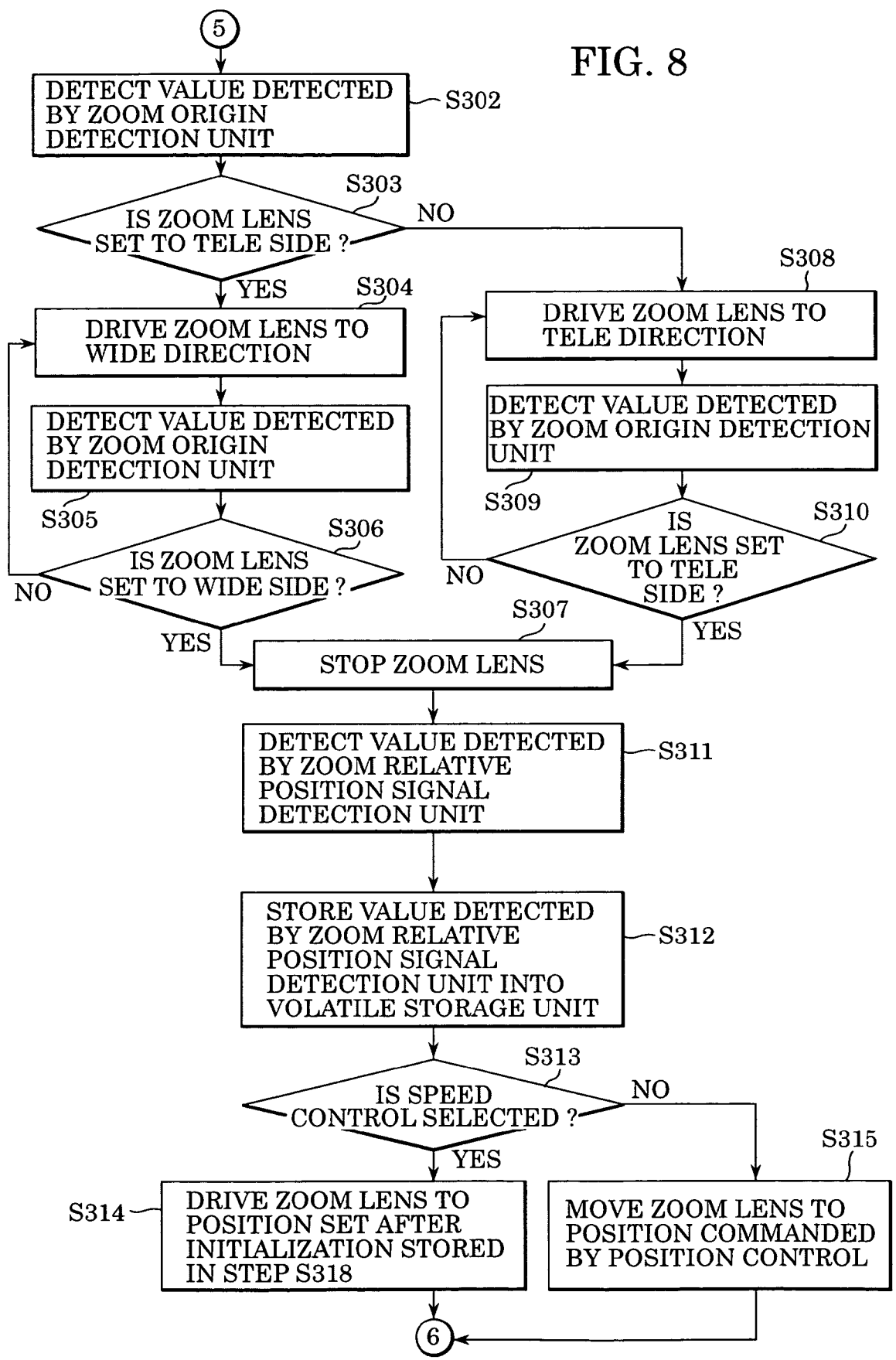
FIG. 8 is a flowchart showing another part of the initialization process according to the third embodiment.

FIGS. 7 and 8 are flowcharts showing an initialization process of the zoom relative position signal detection unit 47 according to the third embodiment performed by the CPU 4.

Since processing in steps S301 to S313, step S315, step S317, and steps S319 to S320 shown in FIGS. 7 and 8 are similar to the processing in step S201 and steps S205 to S220 according to the second embodiment shown in FIGS. 5 and 6, descriptions of these steps will not be repeated here. Referring to FIG. 8, in step S314, the zoom lens is driven to a position set after initialization stored into the nonvolatile storage unit 53 in step S318 shown in FIG. 7, and the process proceeds to step S316 shown in FIG. 7. In step S316, it is determined whether or not the commanded position setting unit 54 is turned on. If the commanded position setting unit 54 is turned on in step S316, the process proceeds to step S317. If the commanded position setting unit 54 is not turned on in step S316, the process proceeds to step S319. In step S318, a value detected by the zoom relative position signal detection unit 47 is stored into the nonvolatile storage unit 53 as the position set after initialization, and the process proceeds to step S319.

As described above, in an optical device including a zoom lens, a focus lens, an iris mechanism, and a driving unit provided for each of the zoom lens, the focus lens, and the iris mechanism, after initialization is automatically performed immediately after power supply is turned on, the lens is automatically driven to a position set after initialization set in advance by a commanded position setting unit if speed control is selected, and the lens is driven to a position commanded by position control if speed control is not selected. Thus, a photographer does not need to adjust the position of the lens after initialization is performed. As a result, the photographer can start photographing immediately after the power supply is turned on. In addition, a picture photographed immediately after the power supply is turned on is prevented from being different from what is intended by the photographer.

According to the third embodiment, using a relative position detection unit, such as an optical incremental sensor or a magnetic incremental sensor, an origin detection unit, and a mechanism for setting the position of the lens after initialization is performed when speed control is selected, every time a power supply is turned on, the position of a lens is detected and stored, the absolute position is automatically initialized, it is determined whether or not the control procedure for the lens is set to speed control, the lens is returned to a position set in advance if speed control is selected, and the lens is driven to a position commanded by position control if speed control is not selected. Thus, a picture photographed immediately after the power supply is turned on is prevented from being different from what is intended by a photographer even if initialization is automatically performed after the power supply is turned on. As a result, the lens can be operated with high accuracy. In addition, the photographer can start photographing immediately after the power supply is turned on.

Fourth Embodiment

A fourth embodiment of the present invention will be described with reference to FIGS. 9, 10, 11, and 12.

Figure 9:
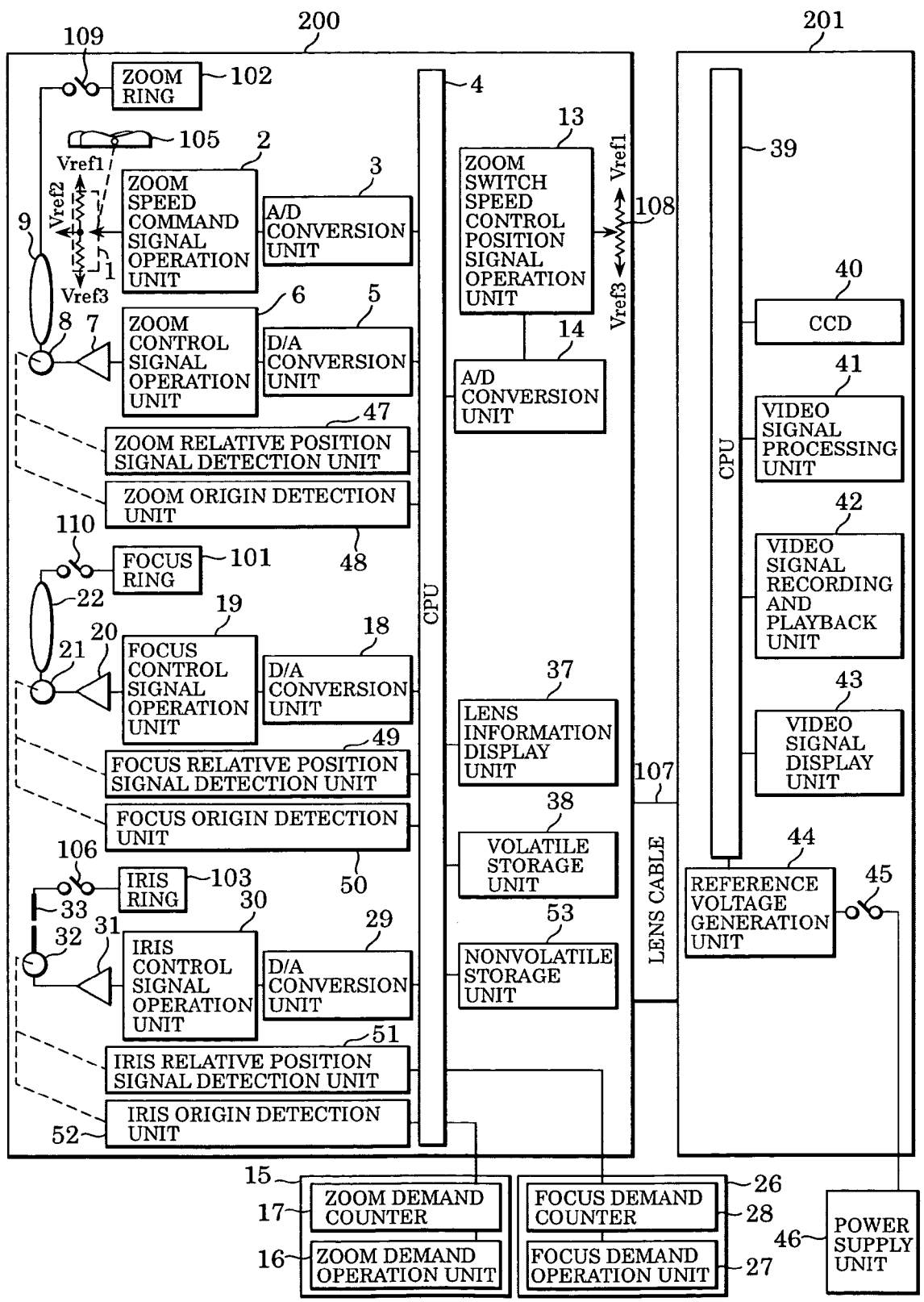
FIG. 9 is a block diagram showing an optical device according to a fourth, fifth, or sixth embodiment of the present invention.

FIG. 9 shows the structure of an optical device according to the fourth embodiment. Since the optical device shown in FIG. 9 has the same structure as the optical device shown in FIG. 6 with the exception that the commanded position setting unit 54 in FIG. 6 is not provided in FIG. 9, the descriptions of the structure of the optical device shown in FIG. 9 is omitted here.

Figure 10:
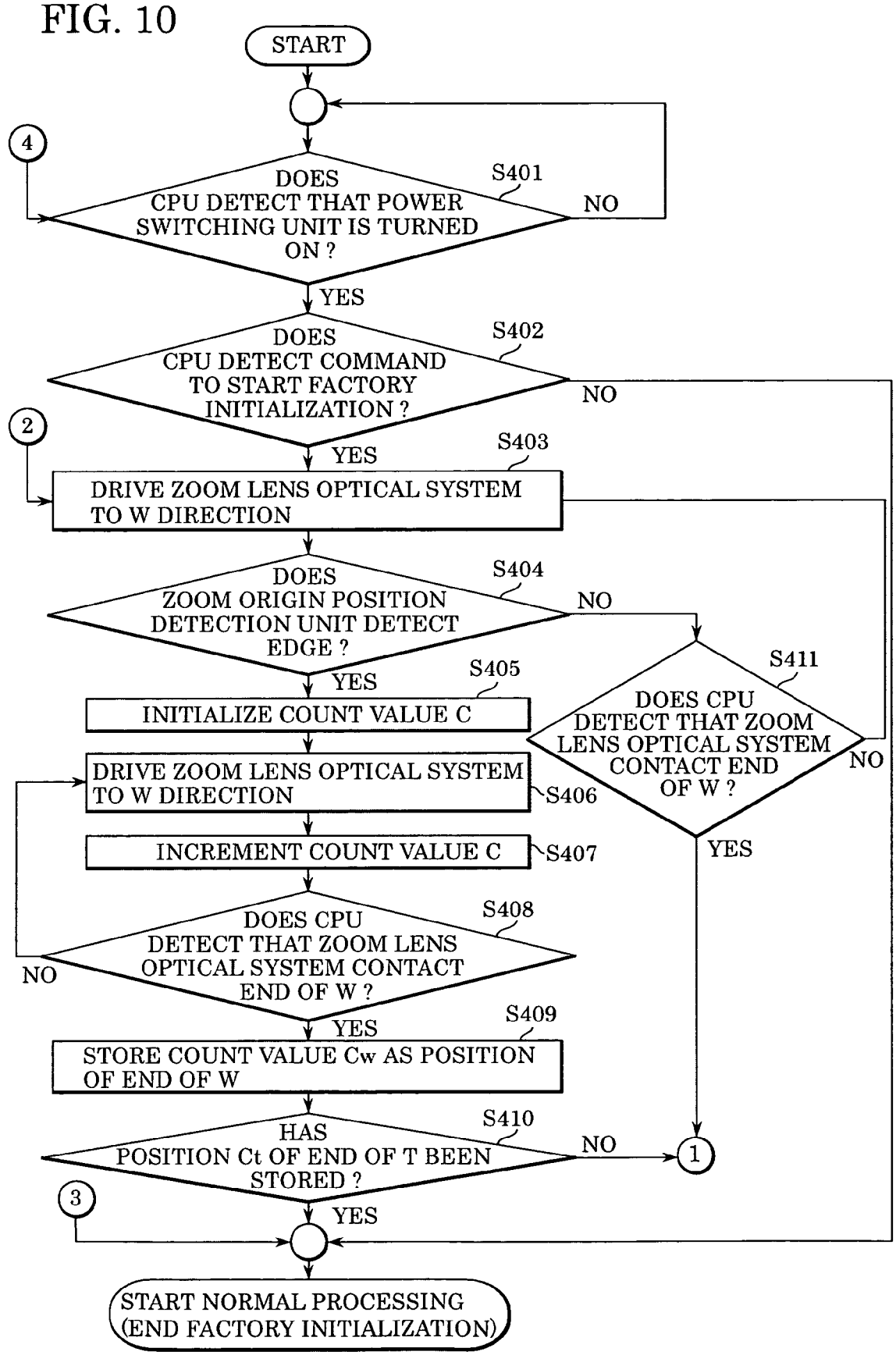
FIG. 10 is a flowchart showing a part of a factory initialization process according to the fourth, fifth, or sixth embodiment.
Figure 11:
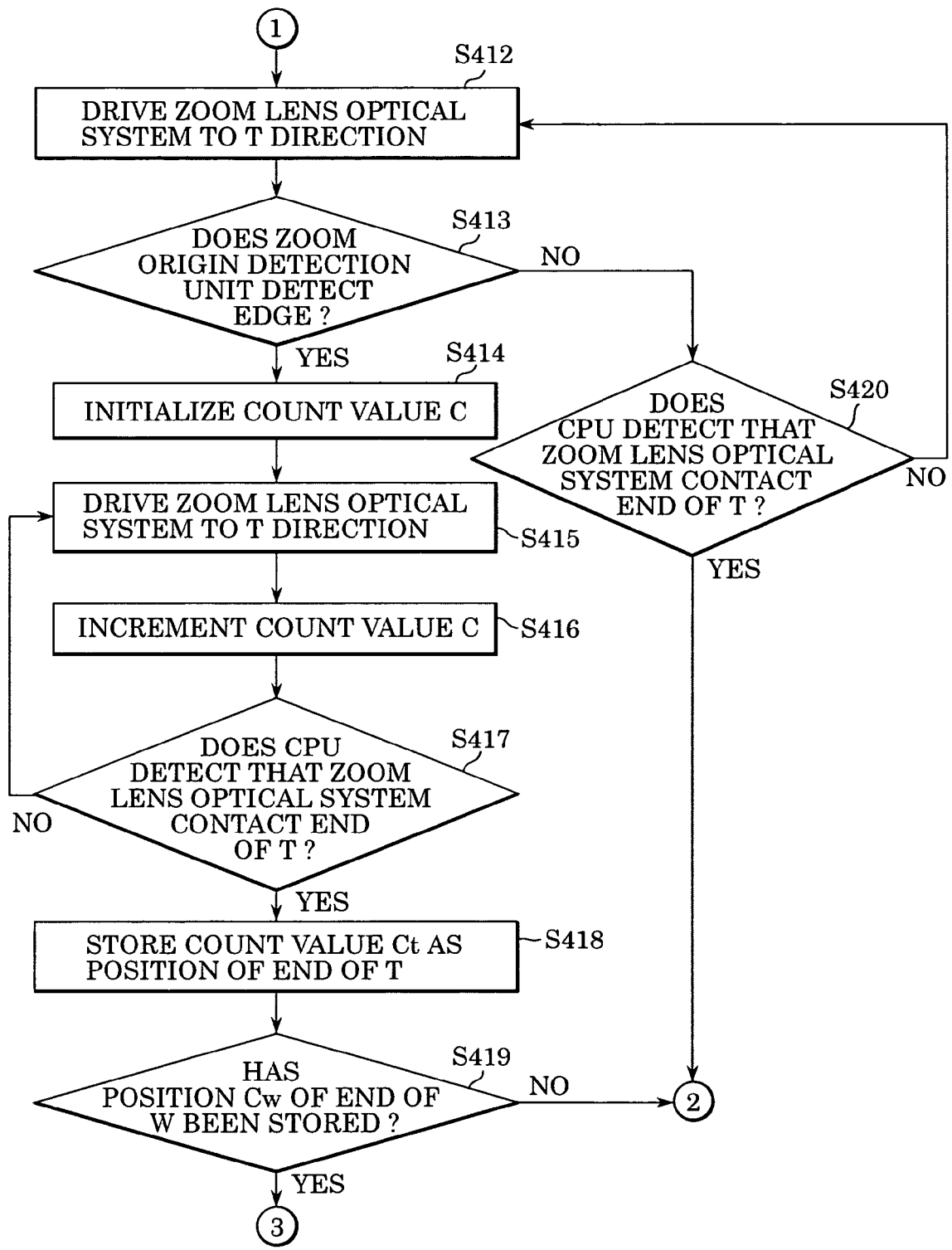
FIG. 11 is a flowchart showing another part of the factory initialization process according to the fourth, fifth, or sixth embodiment.

FIGS. 10 and 11 are flowcharts showing a factory initialization process of the zoom relative position signal detection unit 47 according to the fourth embodiment performed by the CPU 4. Referring to FIG. 10, in step S401, it is determined whether or not the CPU 4 detects that the power switching unit 45 is turned on. If the CPU 4 detects that the power switching unit 45 is turned on in step S401, the process proceeds to step S402. If the CPU 4 does not detect that the power switching unit 45 is turned on in step S401, the process returns to step S401. In step S402, it is determined whether or not the CPU 4 detects a command to start factory initialization. If the CPU 4 detects a command to start factory initialization in step S402, the process proceeds to step S403. If the CPU 4 does not detect a command to start factory initialization in step S402, normal processing shown in FIG. 12 starts.

In step S403, the zoom optical system 9 is driven to the W direction, and the process proceeds to step S404 to determine whether or not the zoom origin detection unit 48 detects an edge. If the zoom origin detection unit 48 detects an edge in step S404, the process proceeds to step S405. If the zoom origin detection unit 48 does not detect an edge in step S404, the process proceeds to step S411 to determine whether or not the CPU 4 detects that the zoom optical system 9 contacts an end of W. If the CPU 4 detects that the zoom optical system 9 contacts the end of W in step S411, the process proceeds to step S412 shown in FIG. 11. If the CPU 4 does not detect that the zoom optical system 9 contacts the end of W in step S411, the process returns to step S403.

In step S405, a count value C is initialized, and the process proceeds to step S406 to drive the zoom optical system 9 to the W direction. Then, in step S407, the count value C is incremented, and the process proceeds to step S408 to determine whether or not the CPU 4 detects that the zoom optical system 9 contacts the end of W. If the CPU 4 detects that the zoom optical system 9 contacts the end of W in step S408, the process proceeds to step S409. If the CPU 4 does not detect that the zoom optical system 9 contacts the end of W in step S408, the process returns to step S406.

Figure 12:
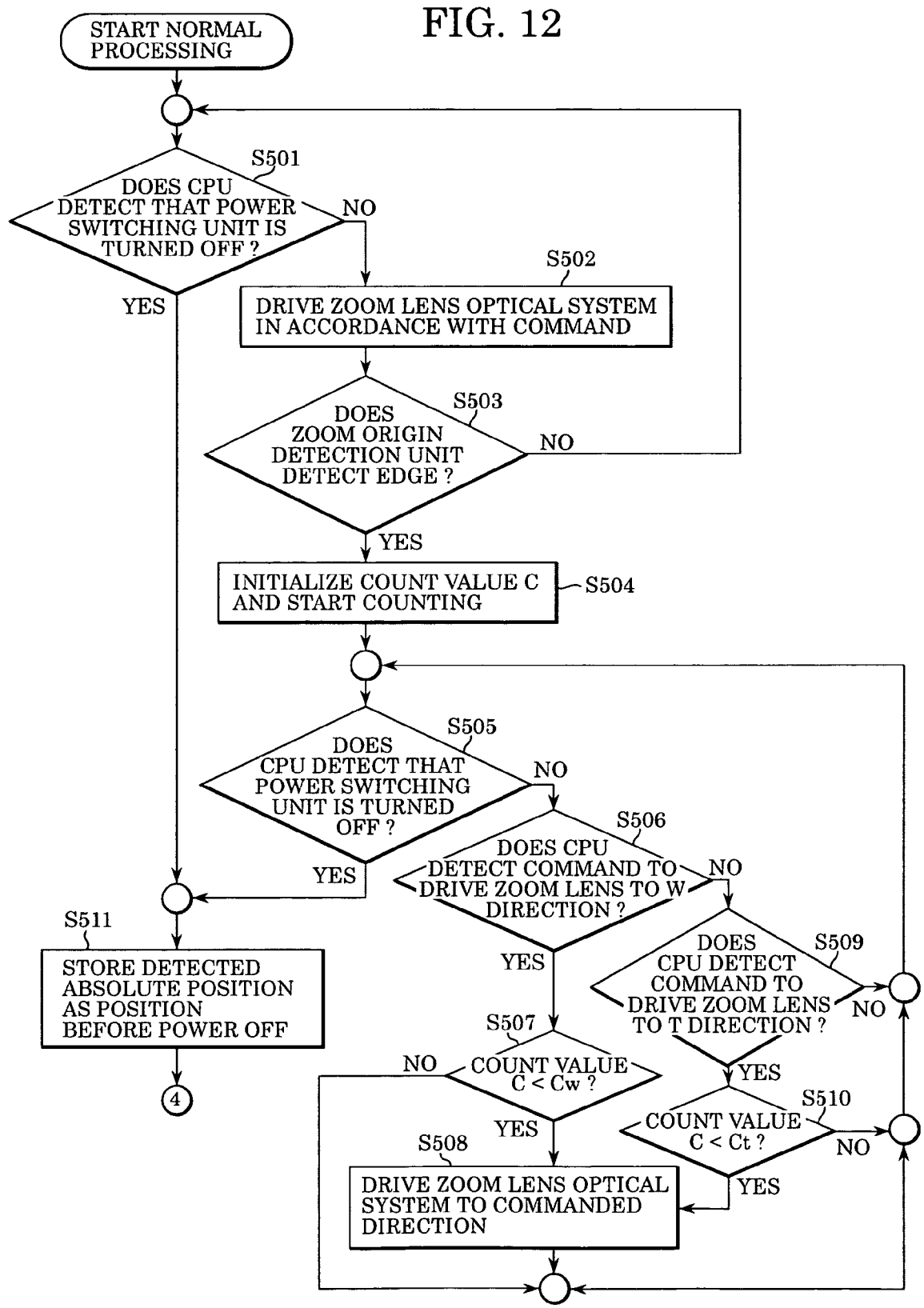
FIG. 12 is a flowchart showing a normal initialization process according to the fourth embodiment.

In step S409, a count value Cw is stored into the nonvolatile storage unit 53 as the position of the end of W. Then, in step S410, it is determined whether or not a position Ct of an end of T has been stored after the power supply is turned on. If the position Ct has been stored in step S410, the normal processing shown in FIG. 12 is performed. If the position Ct has not been stored in step S410, the process proceeds to step S412 to drive the zoom optical system 9 to the T direction. Then, in step S413, it is determined whether or not the zoom origin detection unit 48 detects an edge. If the zoom origin detection unit 48 detects an edge in step S413, the process proceeds to step S414. If the zoom origin detection unit 48 does not detect an edge in step S413, the process proceeds to step S420. In step S420, it is determined whether or not the zoom optical system 9 contacts the end of T. If the CPU 4 does not detect that the zoom optical system 9 contacts the end of T in step S420, the process returns to step S412. If the CPU 4 detects that the zoom optical system 9 contacts the end of T in step S420, the process returns to step S403.

In step S414, a count value C is initialized, and the process proceeds to step S415 to drive the zoom optical system 9 to the T direction. Then, in step S416, the count value C is incremented, and the process proceeds to step S417 to determine whether or not the CPU 4 detects that the zoom optical system 9 contacts the end of T. If the CPU 4 detects that the zoom optical system 9 contacts the end of T in step S417, the process proceeds to step S418. If the CPU 4 does not detect that the zoom optical system 9 contacts the end of T in step S417, the process returns to step S415.

In step S418, a count value Ct is stored into the nonvolatile storage unit 53 as a count value at the end of T, and the process proceeds to step S419 to determine whether or not the position Cw of the end of W has been stored after the power supply is turned on. If the position Cw has been stored in step S419, the normal processing shown in FIG. 12 is performed. If the position Cw has not been stored in step S419, the process returns to step S403. Subsequently, similar processing is repeated.

FIG. 12 is a flowchart showing a normal initialization process of the zoom relative position signal detection unit 47 according to the fourth embodiment performed by the CPU 4. Referring to FIG. 12, in step S501, it is determined whether or not the CPU 4 detects that the power switching unit 45 is turned off. If the CPU 4 detects that the power switching unit 45 is turned off in step S501, the process proceeds to step S511 to store a detected position into the nonvolatile storage unit 53 as a position before the power supply is turned off. Then, the process proceeds to step S401 shown in FIG. 10. If the CPU 4 does not detect that the power switching unit 45 is turned off in step S501, the process proceeds to step S502. A mechanism for storing the position before the power supply is turned off in step S511 is described in the third embodiment.

In step S502, the zoom optical system 9 is driven in accordance with a command. Then, in step S503, it is determined whether or not the zoom origin detection unit 48 detects an edge. If the zoom origin detection unit 48 detects an edge in step S503, the process proceeds to step S504. If the zoom origin detection unit 48 does not detect an edge in step S503, the process returns to step S501. If the CPU 4 detects that the driving procedure for the zoom optical system 9 is switched to motor driving during a period from step S502 to step S503, the zoom optical system 9 may be automatically driven to an edge so that the zoom origin detection unit 48 can detect the edge in step S503.

In step S504, a count value C is initialized, and counting is started. Then, in step S505, it is determined whether or not the CPU 4 detects that the power switching unit 45 is turned off. If the CPU 4 detects that the power switching unit 45 is turned off in step S505, the process proceeds to step S511. In step S511, the above-described processing is performed, and the process proceeds to step S401 shown in FIG. 10. If the CPU 4 does not detect that the power switching unit 45 is turned off in step S505, the process proceeds to step S506 to determine whether or not the CPU 4 detects a command to drive the zoom optical system 9 to the W direction. If the CPU 4 detects a command to drive the zoom optical system 9 to the W direction in step S506, the process proceeds to step S507. If the CPU 4 does not detect a command to drive the zoom optical system 9 to the W direction in step S506, the process proceeds to step S509.

In step S507, it is determined whether or not the condition C<Cw is satisfied. If the condition C<Cw is satisfied in step S507, the process proceeds to step S508. If the condition C<Cw is not satisfied in step S507, the process returns to step S505. In step S508, the zoom optical system 9 is driven to the commanded direction, and the process returns to step S505.

In step S509, it is determined whether or not the CPU 4 detects a command to drive the zoom optical system 9 to the T direction. If the CPU 4 detects a command to drive the zoom optical system 9 to the T direction in step S509, the process proceeds to step S510. If the CPU 4 does not detect a command to drive the zoom optical system 9 to the T direction in step S509, the process returns to step S505.

In step S510, it is determined whether or not the condition C<Ct is satisfied. If the condition C<Ct is satisfied in step S510, the process proceeds to step S508. If the condition C<Ct is not satisfied in step S510, the process returns to step S505. Subsequently, similar processing is repeated.

In steps S501 to S503, a value detected by the zoom relative position signal detection unit 47 may be different from the absolute position. Thus, the lens information display unit 37 may display that initialization is being performed. If communication using the lens cable 107 is performed in the form of serial communication, transmission of a position signal of the zoom lens may be prohibited or a command indicating a position signal of the zoom lens during initialization may be transmitted. If communication using the lens cable 107 is performed in the form of analog values, a line representing permission or prohibition of transmission of a position signal of the zoom lens may be provided to prohibit the transmission of the position signal of the zoom lens during initialization.

Although a case for the zoom optical system 9 has been described in the fourth embodiment, initialization of a relative position signal detection unit for the focus optical system 22 and the iris mechanism 33 may be performed by similar processing.

As described above, in an optical device including a zoom lens, a focus lens, an iris mechanism, a driving unit provided for each of the zoom lens, the focus lens, and the iris mechanism, a zoom operation unit for operating the zoom lens by controlling the driving unit of the zoom lens, a focus operation unit for operating the focus lens by controlling the driving unit of the focus lens, and an iris driving switching unit for switching the driving procedure for the iris mechanism between motor driving and manual driving, after a power supply is turned on, initialization is completed while a normal operation is performed. Thus, a relative position detection unit can be used for a television lens. As a result, a photographer is prevented from feeling uncomfortable due to movement of the zoom ring, focus ring, and iris ring and a change in a picture caused by initialization of the relative position detection unit automatically performed by an absolute position detection unit. In addition, compared with a known procedure using an absolute position detection unit, position detection with higher accuracy and higher operability can be realized. Furthermore, the size of the circuit is reduced, and the cost is thus reduced.

According to the fourth embodiment, using a relative position detection unit, such as an optical incremental sensor or a magnetic incremental sensor, and an origin detection unit, the absolute position is automatically initialized every time a power supply is turned on before shipping, and the absolute position is semi-automatically initialized every time the power supply is turned on for ordinary use. Thus, the position of a lens can be detected with high accuracy. In addition, initialization of the absolute position performed by a photographer every time the power supply is turned on can be eliminated. As a result, the lens including manual driving unit can be operated with high accuracy. In addition, the photographer can start photographing immediately after the power supply is turned on.

Fifth Embodiment

A fifth embodiment of the present invention will be described with reference to FIGS. 9, 10, 11, 13, and 14.

The structure of an optical device according to the fifth embodiment is shown in FIG. 9. A factory initialization process of the zoom relative position signal detection unit 47 according to the fifth embodiment performed by the CPU 4 is shown by the flowcharts in FIGS. 10 and 11. Since FIGS. 10 and 11 have been described in the fourth embodiment, the descriptions will not be repeated here.

Figure 13:
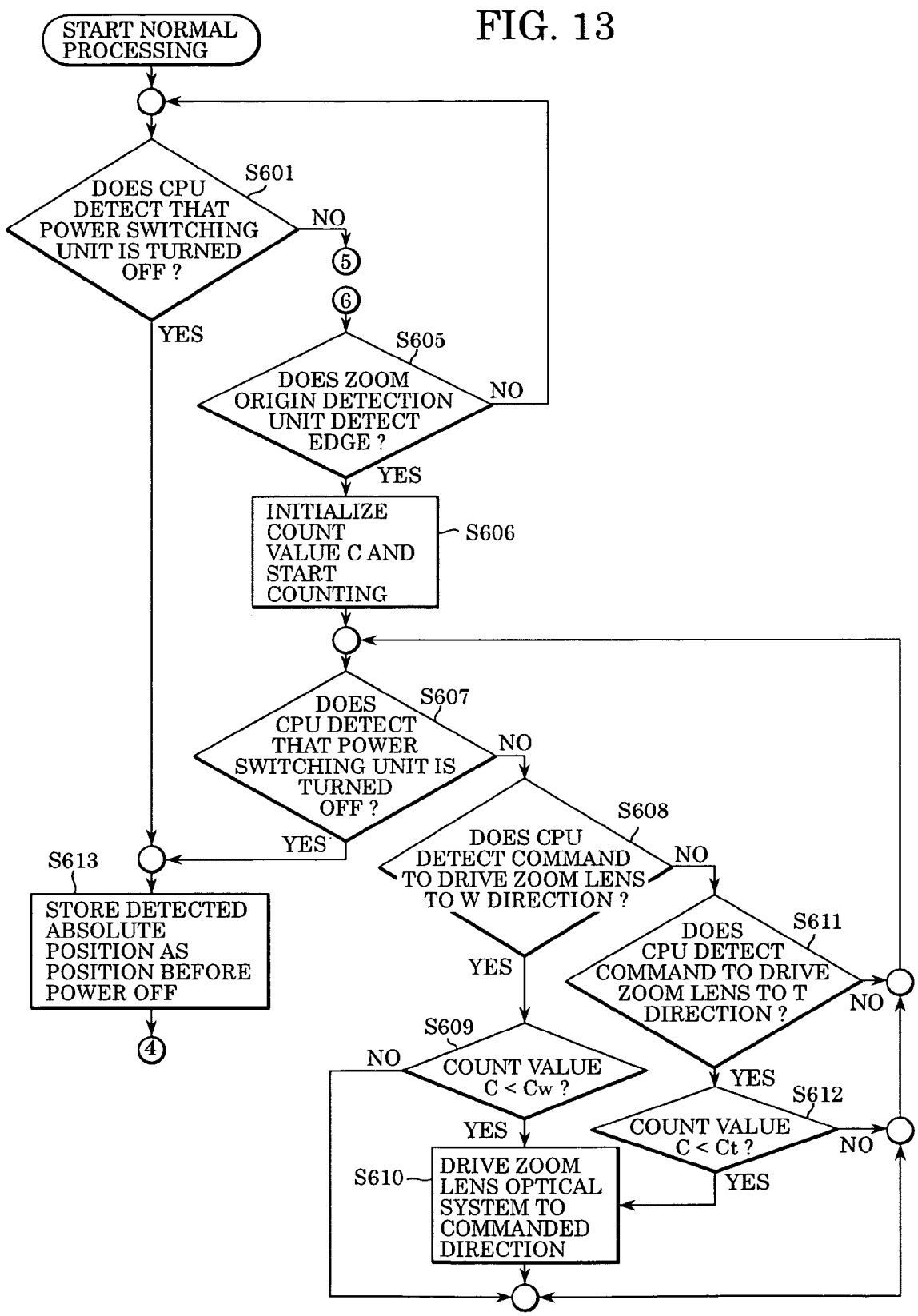
FIG. 13 is a flowchart showing a part of a normal initialization process according to the fifth embodiment.
Figure 14:
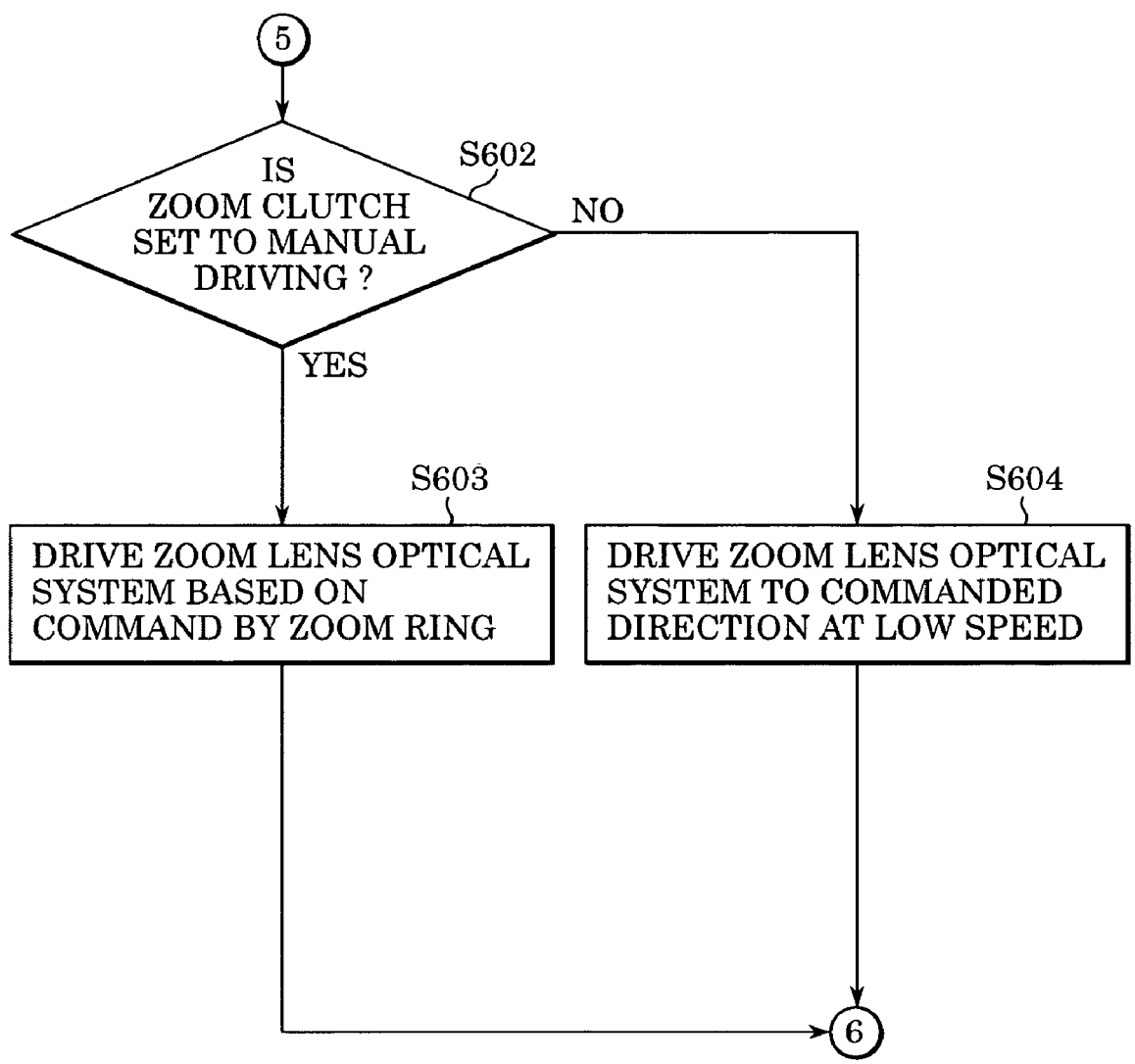
FIG. 14 is a flowchart showing another part of the normal initialization process according to the fifth embodiment.

FIGS. 13 and 14 are flowcharts showing a normal initialization process of the zoom relative position signal detection unit 47 according to the fifth embodiment performed by the CPU 4. Referring to FIG. 13, in step S601, it is determined whether or not the CPU 4 detects that the power switching unit 45 is turned off. If the CPU 4 detects that the power switching unit 45 is turned off in step S601, the process proceeds to step S613 to store a detected position into the nonvolatile storage unit 53 as a position before the power supply is turned off. Then, the process proceeds to step S401 shown in FIG. 10. If the CPU 4 does not detect that the power switching unit 45 is turned off in step S601, the process proceeds to step S602 shown in FIG. 14. A mechanism for storing the position before the power supply is turned off in step S613 is described is the third embodiment.

In step S602, it is determined whether or not the zoom clutch 109 is set to manual driving. If the zoom clutch 109 is set to manual driving in step S602, the process proceeds to step S603. If the zoom clutch 109 is not set to manual driving in step S602, the process proceeds to step S604. In step S603, the zoom optical system 9 is driven in accordance with a command by the zoom ring 102, and the process proceeds to step S605 shown in FIG. 13. In step S604, the zoom optical system 9 is driven in a commanded direction at low speed, and the process proceeds to step S605. If the CPU 4 detects that the driving procedure for the zoom optical system 9 is switched to motor driving in step S604, the zoom optical system 9 may be automatically driven to an edge so that the zoom origin detection unit 48 can detect the edge in step S605.

In step S605, it is determined whether or not the zoom origin detection unit 48 detects an edge. If the zoom origin detection unit 48 detects an edge in step S605, the process proceeds to step S606. If the zoom origin detection unit 48 does not detect an edge in step S605, the process returns to step S601.

In step S606, a count value C is initialized, and counting is started. Then, in step S607, it is determined whether or not the CPU 4 detects that the power switching unit 45 is turned off. If the CPU 4 detects that the power switching unit 45 is turned off in step S607, the process proceeds to step S613 to perform the above-described processing. Then, the process proceeds to step S401 shown in FIG. 10. If the CPU 4 does not detect that the power switching unit 45 is turned off in step S607, the process proceeds to step S608.

In step S608, it is determined whether or not the CPU 4 detects a command to drive the zoom optical system 9 in the W direction. If the CPU 4 detects a command to drive the zoom optical system 9 to the W direction in step S608, the process proceeds to step S609. If the CPU 4 does not detect a command to drive the zoom optical system 9 to the W direction in step S608, the process proceeds to step S611.

In step S609, it is determined whether or not the condition C<Cw is satisfied. If the condition C<Cw is satisfied in step S609, the process proceeds to step S610. If the condition C<Cw is not satisfied in step S609, the process returns to step S607. In step S610, the zoom optical system 9 is driven to the commanded direction, and the process returns to step S607.

In step S611, it is determined whether or not the CPU 4 detects a command to drive the zoom optical system 9 to the T direction. If the CPU 4 detects a command to drive the zoom optical system 9 to the T direction in step S611, the process proceeds to step S612. If the CPU 4 does not detect a command to drive the zoom optical system 9 to the T direction in step S611, the process returns to step S607.

In step S612, it is determined whether or not the condition C<Ct is satisfied. If the condition C<Ct is satisfied in step S612, the process proceeds to step S610. If the condition C<Ct is not satisfied in step S612, the process returns to step S607. Subsequently, similar processing is repeated.

In steps S601 to S604, a value detected by the zoom relative position signal detection unit 47 may be different from the absolute position. Thus, the lens information display unit 37 may display that initialization is being performed. If communication using the lens cable 107 is performed in the form of serial communication, transmission of a position signal of the zoom lens may be prohibited or a command indicating a position signal of the zoom lens during initialization may be transmitted. If communication using the lens cable 107 is performed in the form of analog values, a line representing permission or prohibition of transmission of a position signal of the zoom lens may be provided to prohibit the transmission of the position signal of the zoom lens during initialization.

The zoom optical system 9 is driven at a low speed to a direction commanded by the zoom switch 105 or the zoom demand operation unit 16 in step S604. However, the zoom optical system 9 may be driven at a commanded speed when the commanded direction is equal to the direction of the origin and the zoom optical system 9 may be driven at a low speed only when the commanded direction is equal to the direction of an end. Alternatively, the zoom optical system 9 may be driven at a commanded speed when the commanded direction is equal to the direction of the origin and the zoom optical system 9 may not be driven to the direction of the end. In addition, the zoom optical system 9 may be driven to a position immediately before the end and the subsequent driving may be prohibited on the basis of the absolute position stored in the nonvolatile storage unit 53. If a control procedure is set to position control, it is determined whether or not a commanded direction is the direction of the end in step S613 in accordance with the position before the power supply is turned off stored in the nonvolatile storage unit 53.

Although a case for the zoom optical system 9 has been described in the fifth embodiment, initialization of a relative position signal detection unit for the focus optical system 22 and the iris mechanism 33 may be performed by similar processing.

As described above, in an optical device including a zoom lens, a focus lens, an iris mechanism, a driving unit provided for each of the zoom lens, the focus lens, and the iris mechanism, a zoom operation unit for operating the zoom lens by controlling the driving unit of the zoom lens, a focus operation unit for operating the focus lens by controlling the driving unit of the focus lens, and an iris driving switching unit for switching the driving procedure for the iris mechanism between motor driving and manual driving, until the zoom lens, the focus lens, or the iris mechanism passes through an origin and initialization is completed immediately after a power supply is turned on, irrespective of a command signal, the zoom lens, the focus lens, or the iris mechanism can be driven at a low speed, can be driven at a low speed only to the direction of an end, or cannot be driven to the direction of the end. Thus, collision against the end with high-speed driving due to an incorrect calculated position before initialization is completed can be prevented, and a photographer can recognize that the calculated position is a value before initialization is completed. In addition, in an operation mode, such as a virtual studio, in which highly accurate absolute position is required, a malfunction, such as use of a calculated position with large error, can be prevented.

Here, the term "low speed" means about 85% of the maximum speed or less. The term "low speed" is about 75% of the maximum speed or less. The term "low speed" is about 55% of the maximum speed or more.

According to the fifth embodiment, using a relative position detection unit, such as an optical incremental sensor or a magnetic incremental sensor, and an origin detection unit, the absolute position is automatically initialized every time a power supply is turned on before shipping, and the absolute position is semi-automatically initialized every time the power supply is turned on for ordinary use. Until initialization for ordinary use is completed, motor driving is performed at a low speed, motor driving in the direction of an end is performed at a low speed, or motor driving in the direction of the end is prohibited. Thus, collision against the end with high-speed driving due to an incorrect absolute position before initialization is completed can be prevented, and a photographer can recognize that the calculated position is a value before initialization is completed. In addition, in an operation mode, such as a virtual studio, in which a highly accurate absolute position is required, a malfunction, such as use of a calculated position with large error, can be prevented.

Sixth Embodiment

A sixth embodiment of the present invention will be described with reference to FIGS. 9, 10, 11, 15, and 16.

The structure of an optical device according to the sixth embodiment is shown in FIG. 9. A factory initialization process of the zoom relative position signal detection unit 47 according to the sixth embodiment performed by the CPU 4 is shown by the flowcharts in FIGS. 10 and 11. Since FIGS. 10 and 11 have been described in the fourth embodiment, the descriptions will not be repeated here.

Figure 15:
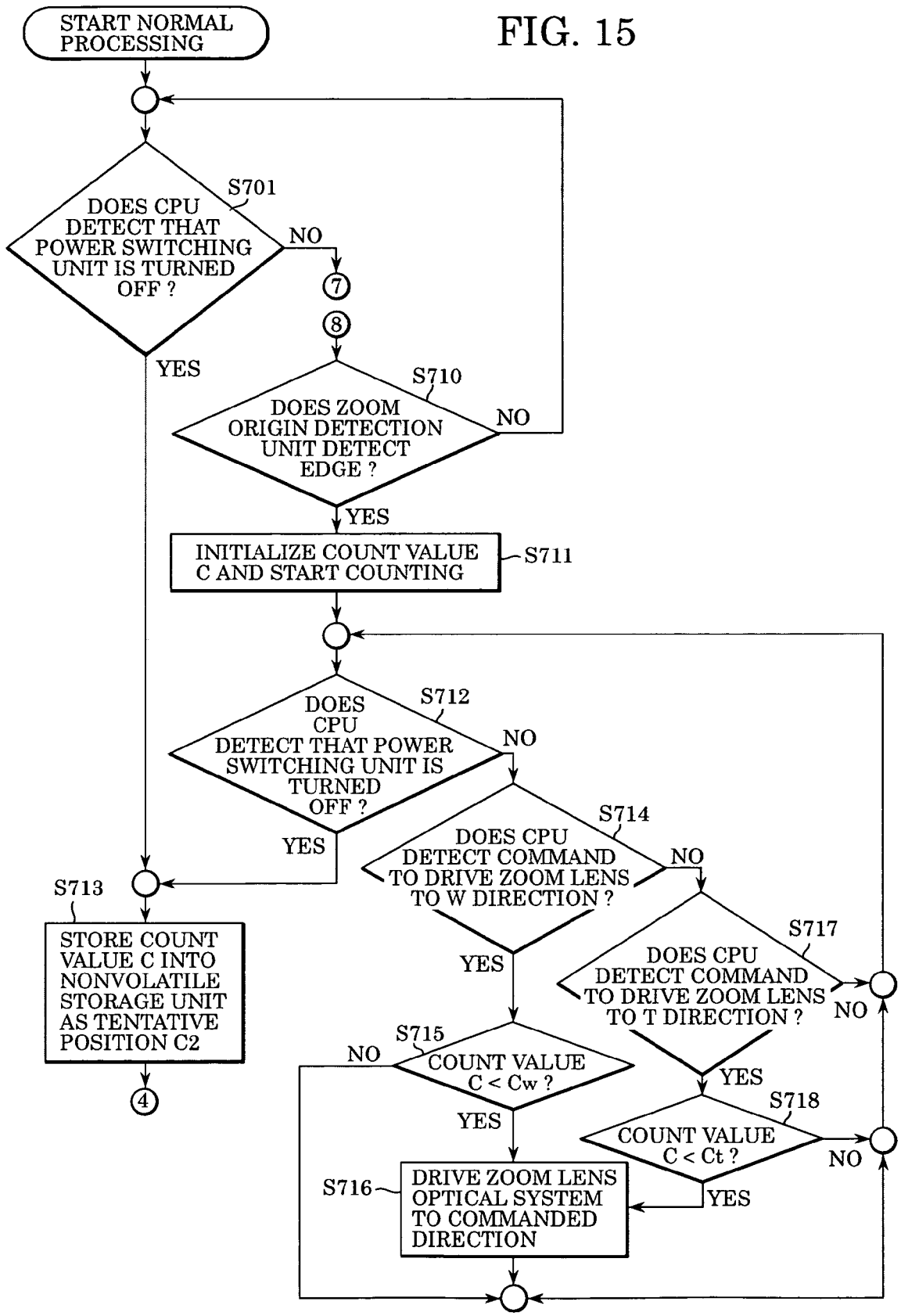
FIG. 15 is a flowchart showing a part of a normal initialization process according to the sixth embodiment.
Figure 16:
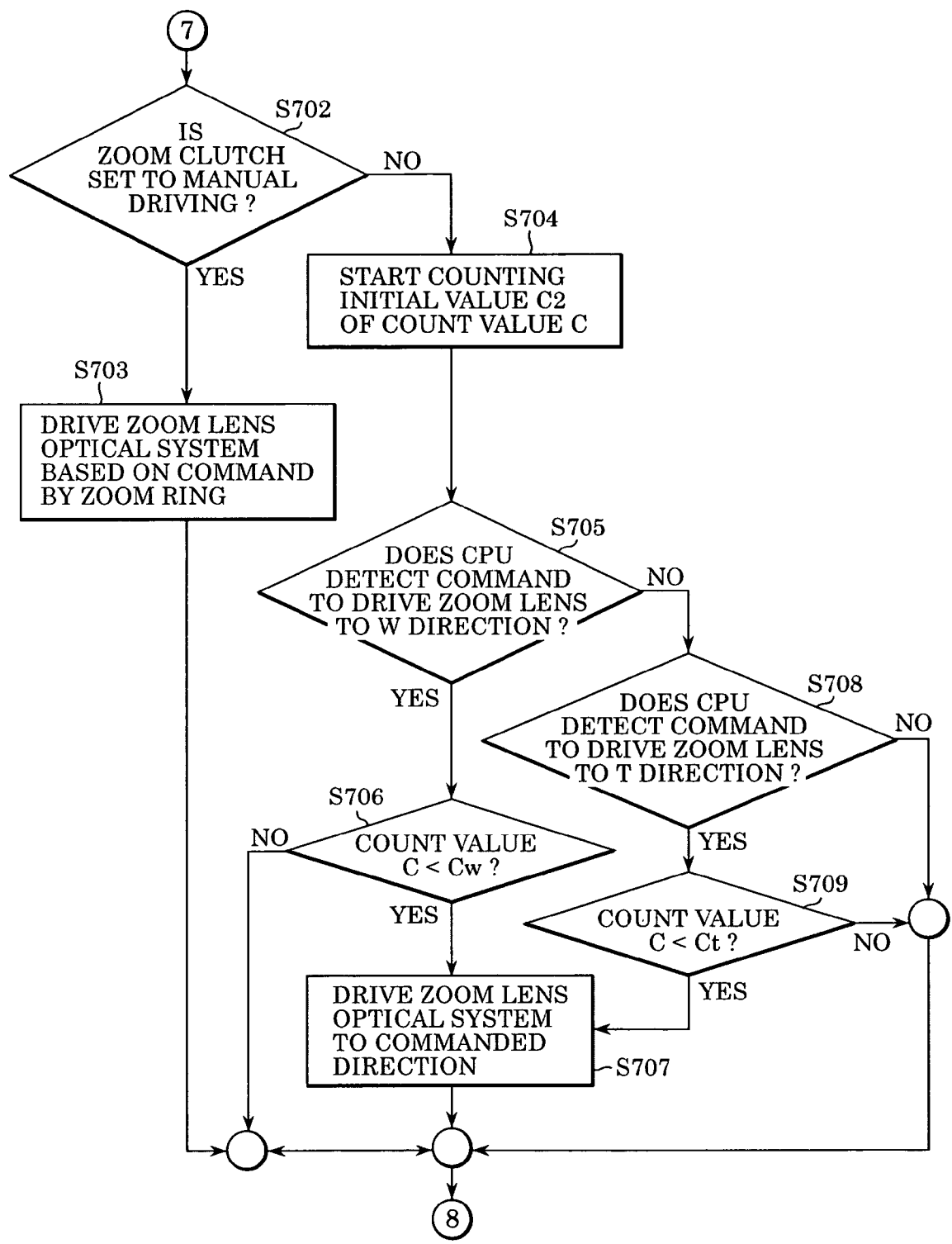
FIG. 16 is a flowchart showing another part of the normal initialization process according to the sixth embodiment.
Figure 17:
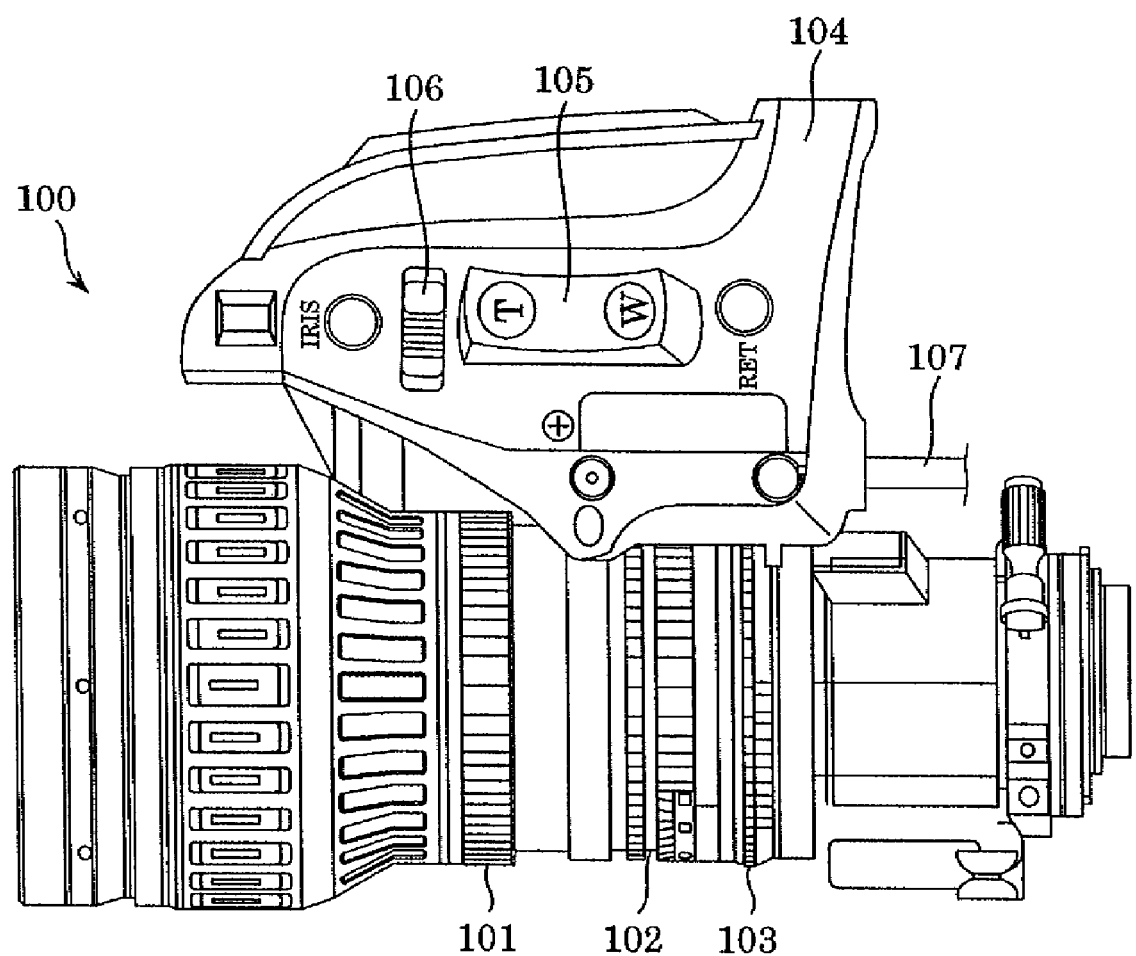
FIG. 17 is a top view of a zoom lens.
Figure 18:
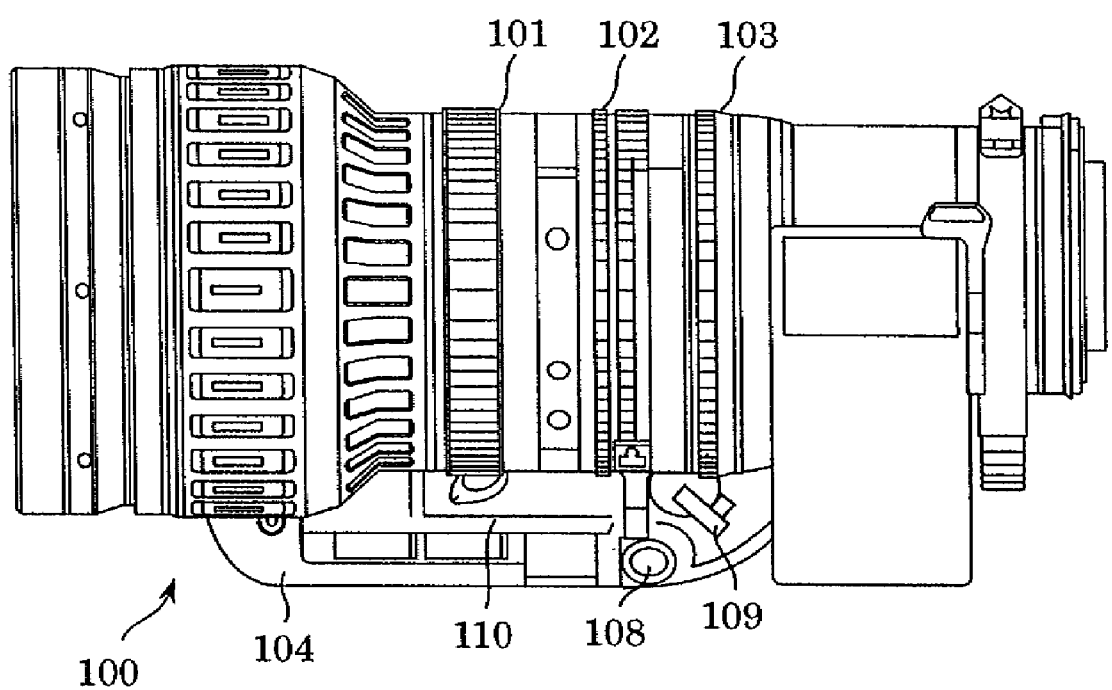
FIG. 18 is a side view of the zoom lens.

FIGS. 15 and 16 are flowcharts showing a normal initialization process of the zoom relative position signal detection unit 47 according to the sixth embodiment performed by the CPU 4. Since processing in steps S702, S703, S704, S710, S711, S712, S714, S715, S716, S717, and S718 shown in FIGS. 15 and 16 are similar to the processing in steps S602, S603, S604, S605, S606, S607, S608, S609, S610, S611, and S612 shown in FIGS. 13 and 14, descriptions of these steps will not be repeated here. Referring to FIG. 15, in step S701, it is determined whether or not the CPU 4 detects that the power switching unit 45 is turned off. If the CPU 4 detects that the power switching unit 45 is turned off in step S701, the process proceeds to step S713. If the CPU 4 does not detect that the power switching unit 45 is turned off in step S701, the process proceeds to step S702 shown in FIG. 16. In step S713, a count value C is stored into the nonvolatile storage unit 53 as a tentative position C2, and the process proceeds to step S401 shown in FIG. 10. However, if the control procedure is set to speed control, instead of position control, there is no need to store the position before the power supply is turned off. Thus, before the processing in step S713, the selected control procedure may be determined, and the position before the power supply is turned off may be stored into the nonvolatile storage unit 53 only when the control procedure is set to position control.

In step S705 shown in FIG. 16, it is determined whether or not the CPU 4 detects a command to drive the zoom optical system 9 to the W direction. If the CPU 4 detects a command to drive the zoom optical system 9 to the W direction in step S705, the process proceeds to step S706. If the CPU 4 does not detect a command to drive the zoom optical system 9 to the W direction in step S705, the process proceeds to step S708. In step S706, it is determined whether or not the condition C<Cw is satisfied. If the condition C<Cw is satisfied in step S706, the process proceeds to step S707. If the condition C<Cw is not satisfied in step S706, the process proceeds to step S710 shown in FIG. 15. In step S707, the zoom optical system 9 is driven to the commanded direction, and the process proceeds to step S710.

In step S708, it is determined whether or not the CPU 4 detects a command to drive the zoom optical system 9 to the T direction. If the CPU 4 detects a command to drive the zoom optical system 9 to the T direction in step S708, the process proceeds to step S709. If the CPU 4 does not detect a command to drive the zoom optical system 9 to the T direction in step S708, the process proceeds to step S710. In step S709, it is determined whether or not the condition C<Ct is satisfied. If the condition C<Ct is satisfied in step S709, the process proceeds to step S707. If the condition C<Ct is not satisfied in step S709, the process proceeds to step S710. Subsequently, similar processing is repeated.

In steps S701 and S712, turning off the power switching unit 45 is determined by drop of a power supply voltage to a predetermined value or less. In accordance with a result, if it is determined that the power switching unit 45 is turned off, the process proceeds to step S713. However, by separately providing a power source, such as a small battery, after confirming that the power supply voltage is completely dropped to the ground level, the process may proceed to step S713 using the power supply of the small battery or the like to store the zoom position when the power supply is turned off into the nonvolatile storage unit 53.

Alternatively, similar processing to the processing in step S713 may be performed in steps S711, S712, S714, S715, S716, S717, and S718 at predetermined intervals, so that the zoom position when the power supply is turned off is stored into the nonvolatile storage unit 53.

Alternatively, when the zoom optical system 9 stops for a predetermined time or more in steps S711, S712, S714, S715, S716, S717, and S718, similar processing to the processing in step S713 may be performed, so that the zoom position when the power supply is turned off is stored into the nonvolatile storage unit 53.

Alternatively, a command to perform similar processing to the processing in step S713 may be transmitted via the lens cable 107 from the CPU 39 of the television camera 201 before the power supply drops immediately after the power switching unit 45 is turned off, so that the zoom position when the power supply is turned off is stored into the nonvolatile storage unit 53.

Although a case for the zoom optical system 9 has been described in the sixth embodiment, initialization of a relative position signal detection unit for the focus optical system 22 and the iris mechanism 33 may be performed by similar processing.

As described above, in an optical device including a zoom lens, a focus lens, an iris mechanism, a driving unit provided for each of the zoom lens, the focus lens, and the iris mechanism, a zoom operation unit for operating the zoom lens by controlling the driving unit of the zoom lens, a focus operation unit for operating the focus lens by controlling the driving unit of the focus lens, and an iris driving switching unit for switching the driving procedure for the iris mechanism between motor driving and manual driving, the position of a lens when a power supply is turned off is stored into a nonvolatile storage unit. After the power supply is turned on again, until initialization is performed by detecting an edge by an origin detection unit, a tentative position of the lens is detected. Thus, the lens can be driven and the tentative potion of the lens can be sent back to a camera. Therefore, a photographer can start photographing immediately after the power supply is turned on, and a picture photographed immediately after the power supply is turned on is prevented from being different from what is intended by the photographer. In addition, even before initialization is completed, the tentative position of the lens can be displayed, using an iris or the like, on a viewfinder of the camera. In addition, collision against an end of T or an end of W at a high speed when motor driving is performed can be prevented.

According to the sixth embodiment, using a relative position detection unit, such as an optical incremental sensor or a magnetic incremental sensor, and an origin detection unit, the absolute position is automatically initialized every time a power supply is turned on before shipping, the absolute position is semi-automatically initialized every time the power supply is turned on for ordinary use, and an absolute position detected when the power supply is turned off is stored. Thus, from after the power supply is turned on for ordinary use until initialization is completed, a photographer can start photographing immediately after the power supply is turned on, and a picture photographed immediately after the power supply is turned on is prevented from being different from what is intended by the photographer. In addition, if a motor driving control unit is selected before initialization is completed, collision of the lens against an end of T or an end of W can be prevented. Furthermore, even before initialization is completed, the absolute position of the lens can be displayed on a viewfinder.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-099141 filed Mar. 30, 2004, and Japanese Patent Application No. 2004-110180 filed Apr. 2, 2004, which are hereby incorporated by reference herein.

What is claimed is:

1. A lens device comprising:
   an optical element;
   a relative position control unit configured to control a relative position of the optical element;
   a relative position detection unit; and
   an initialization control unit initializing an absolute position of the optical element after a power supply is turned on and returning the optical element to a position before the initialization in a first mode in which a control procedure for moving the optical element is set to a speed control procedure, and driving the optical element in accordance with a position command signal in a second mode in which a control procedure for moving the optical element is set to a position control procedure.

2. The lens device according to claim 1, further comprising an absolute position detection unit.

3. The lens device according to claim 1, further comprising an absolute position signal sending unit sending a signal indicating that an absolute position signal of the optical element is invalid to a camera device, responsive to the initialization control unit initializing the absolute position of the optical element.

4. The lens device according to claim 1, further comprising:
   a storage unit storing the absolute position of the optical element before the power supply is turned off; and
   an absolute position signal sending unit sending a signal indicating an absolute position signal of the optical element stored in the storage unit before the power supply is turned off to a camera device.

5. The lens device according to claim 1, further comprising a display unit displaying that the initialization control unit is initializing the absolute position of the optical element.

6. The lens device according to claim 1, wherein the optical element includes at least a zoom lens, a focus lens, and an iris.

7. The lens device according to claim 6, further comprising an absolute position detection unit; and
   an absolute position control unit controlling an absolute position of the optical element.

8. The lens device according to claim 1, further comprising a nonvolatile storage unit storing the absolute position of the optical element before a voltage level of the power supply becomes zero when the power supply is turned off.

9. An imaging apparatus comprising:
   the lens device according to claim 1; and
   a camera device installed to the lens device.

10. The imaging apparatus according to claim 9, wherein a viewfinder of the camera device displays that the initialization control unit is initializing the absolute position.

* * * * *